US012411448B2

(12) United States Patent
Deno

(10) Patent No.: US 12,411,448 B2
(45) Date of Patent: Sep. 9, 2025

(54) IMAGE FORMING APPARATUS

(71) Applicant: CANON KABUSHIKI KAISHA, Tokyo (JP)

(72) Inventor: Kohei Deno, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/428,330

(22) Filed: Jan. 31, 2024

(65) Prior Publication Data

US 2024/0255888 A1 Aug. 1, 2024

(30) Foreign Application Priority Data

Feb. 1, 2023 (JP) ................................ 2023-013960
Dec. 6, 2023 (JP) ................................ 2023-206520

(51) Int. Cl.
*G03G 15/00* (2006.01)
*G03G 15/16* (2006.01)

(52) U.S. Cl.
CPC ..... *G03G 15/6579* (2013.01); *G03G 15/1605* (2013.01); *G03G 15/50* (2013.01); *G03G 15/6508* (2013.01); *G03G 2215/00721* (2013.01)

(58) Field of Classification Search
CPC ........... G03G 15/6567; G03G 15/6564; G03G 15/6561; G03G 2215/00561; G03G 15/5029
See application file for complete search history.

(56) References Cited

U.S. PATENT DOCUMENTS

| | | | | | |
|---|---|---|---|---|---|
| 8,408,830 | B2 | 4/2013 | Ogata et al. | | |
| 2016/0023858 | A1* | 1/2016 | Mizuno | B65H 7/06 | 271/228 |
| 2016/0252861 | A1* | 9/2016 | Aoki | B65H 9/103 | 399/66 |
| 2019/0330001 | A1* | 10/2019 | Matsuda | G03G 15/6561 | |
| 2020/0186654 | A1* | 6/2020 | Shiokawa | H04N 1/0066 | |

FOREIGN PATENT DOCUMENTS

| | | | |
|---|---|---|---|
| JP | 2002-006718 | A | 1/2002 |
| JP | 2006-293280 | A | 10/2006 |
| JP | 2009-143643 | A | 7/2009 |

* cited by examiner

*Primary Examiner* — Jessica L Eley
(74) *Attorney, Agent, or Firm* — Venable LLP

(57) ABSTRACT

An image forming apparatus includes a re-conveyance portion to reverse a sheet on which a first toner image is transferred on a first surface by a transfer portion and to convey the sheet to the transfer portion again, and first and second detecting portions to detect positions in a widthwise direction of the sheet. The first detecting portion detects a first detecting position before the first toner image is transferred to the first surface and the second detecting portion detects a second detecting position after the first toner image is transferred and before a second toner image is transferred on a second surface. A controller determines a first image forming position where a latent image is formed on a photosensitive member before the first detecting position is detected and determines a second image forming position based on the first image forming position, and the first and second detecting positions.

13 Claims, 15 Drawing Sheets

IMAGE FORMING APPARATUS

FIELD OF THE INVENTION AND RELATED ART

The present invention relates to an image forming apparatus that forms images on sheets.

According to Japanese Laid-Open Patent Application No. 2009-143643, an image forming apparatus equipped with a shift (one-sided leaning) detection sensor that detects the position of an end portion of a sheet in the width direction and a registration roller positioned upstream of the shift detection sensor in the sheet feeding direction is proposed. The registration roller can shift the sheet in the width direction by moving in the axial direction, i.e., in the width direction, while nipping the sheet in between.

According to Japanese Laid-Open Patent Application No. 2006-293280, an image forming apparatus equipped with a sheet detection sensor for measuring the leading end and side end positions of a sheet and a registration roller positioned upstream of the sheet detection sensor in the feeding direction of the sheet is proposed. Based on the detection results of the sheet detection sensor, the control portion of the image forming apparatus calculates the amount of deviation (shift) of the sheet from the predetermined leading end and side end positions of the sheet, and corrects the timing of writing images on the photosensitive member and the writing positions in the width direction.

However, the image forming apparatus described in Japanese Laid-Open Patent Application No. 2009-143643 requires a motor or other mechanism to shift the registration rollers in the width direction. In addition, when the sheet nipped by the registration rollers is shifted in the width direction, a mechanism to release the nip of the loop roller pair located upstream of the registration rollers in the feeding direction is also required. This makes the equipment larger in size and increases costs.

In the image forming apparatus described in Japanese Laid-Open Patent Application No. 2006-293280, the distance from the sheet detection sensor to the secondary transfer portion is longer than the distance from the first color electrostatic latent image forming position to the secondary transfer portion. Because the sheet detection sensor and each photosensitive member are located in this way, the size of the image forming apparatus has become larger.

SUMMARY OF THE INVENTION

The purpose of the present invention is to provide an image forming apparatus capable of obtaining high quality results with minimal misalignment of toner images on the front and back surfaces, while keeping the apparatus compact.

The present invention is an image forming apparatus comprising a photosensitive member, an exposing portion configured to expose the photosensitive member and to form a first electrostatic latent image and a second electrostatic latent image on the photosensitive member, a developing portion configured to develop the first electrostatic latent image and the second electrostatic latent image on the photosensitive member as a first toner image and a second toner image, respectively, a transfer portion configured to transfer the first toner image and the second toner image onto a first surface and a second surface of a sheet, respectively, a re-conveyance portion configured to reverse a front surface and a back surface of the sheet on which the first toner image is transferred on the first surface by the transfer portion and to convey the sheet to the transfer portion again, a first detecting portion, in an upstream position of the transfer portion with respect to a sheet conveyance direction, configured to detect a first detecting position which is a position of the sheet on which before the first toner image is transferred to first surface with respect to a widthwise direction perpendicular to the sheet conveyance direction, a second detecting portion, in the re-conveyance portion, configured to detect a second detecting position which is a position of the sheet on which after the first toner image has been transferred to first surface and before the second toner image is transferred on the second surface with respect to the widthwise direction, and a control portion configured to control the exposing portion so as to form the first electrostatic latent image onto the photosensitive member at a first image forming position and to form the second electrostatic latent image onto the photosensitive member at a second image forming position, wherein the control portion executes in a first mode in which the control portion determines the first image forming position before the first detecting position of the sheet is detected by the first detecting portion and determines the second image forming position based on the first image forming position, the first detecting position and the second detecting position.

Further features of the present invention will become apparent from the following description of exemplary embodiments with reference to the attached drawings.

Figure 3:
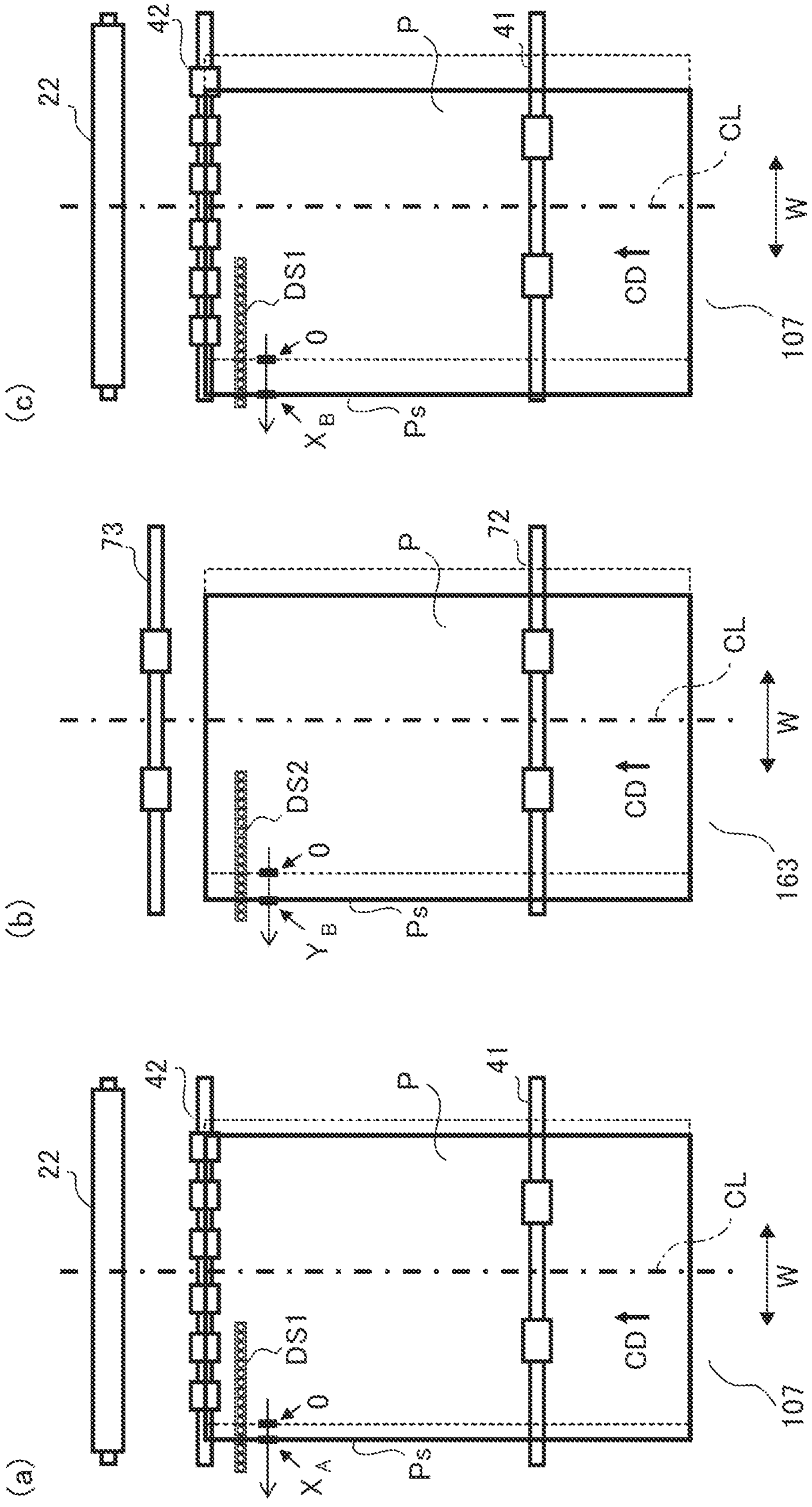

Part (a) of FIG. 3 shows the first side end sensor and the first detection position, part (b) of FIG. 3 shows the second side end sensor and the second detection position, and part (c) of FIG. 3 shows the first side end sensor and the third detection position.

Figure 4:
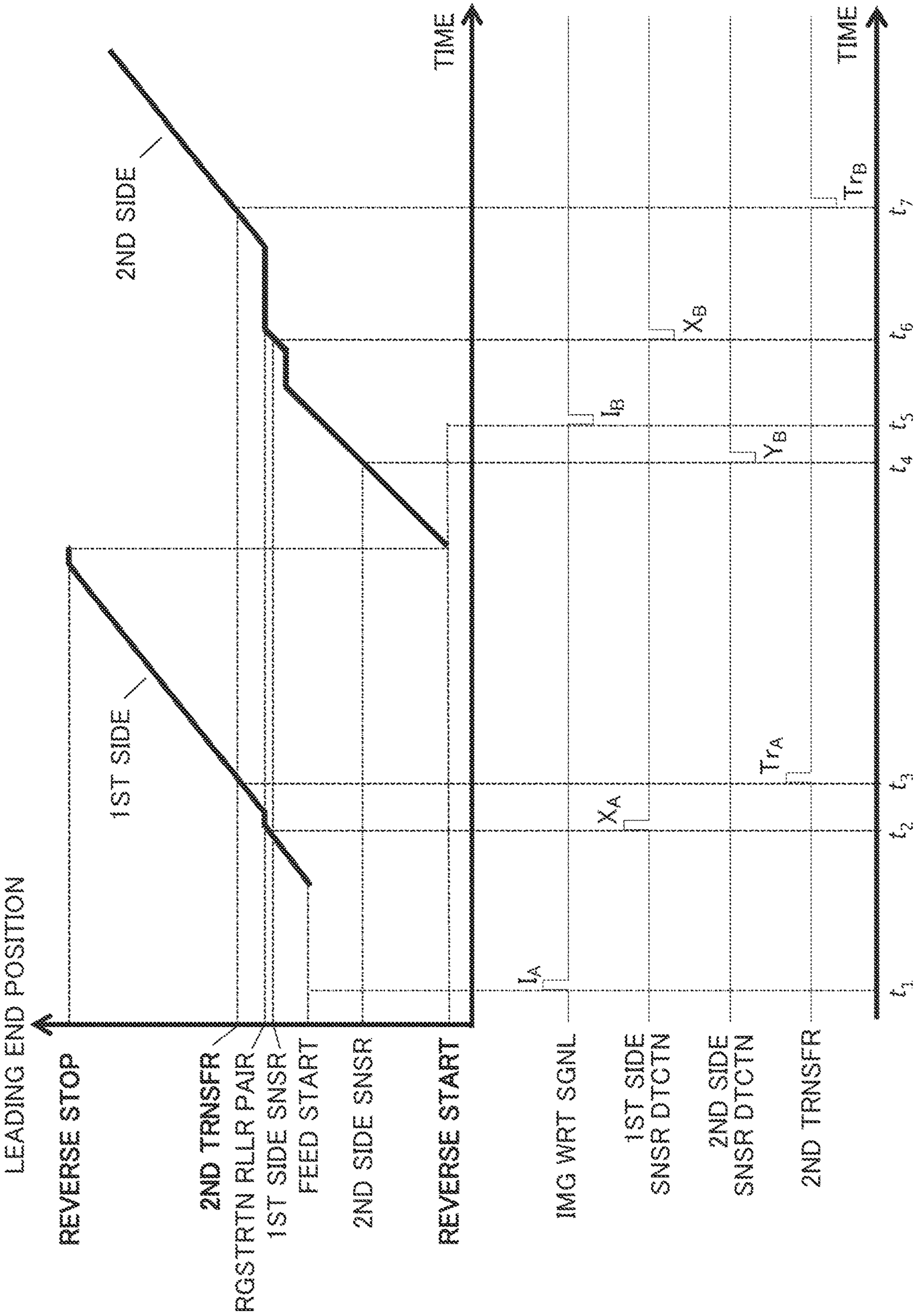

FIG. 4 shows the leading end position of a sheet being conveyed and the various control timings in the printer.

Figure 5:
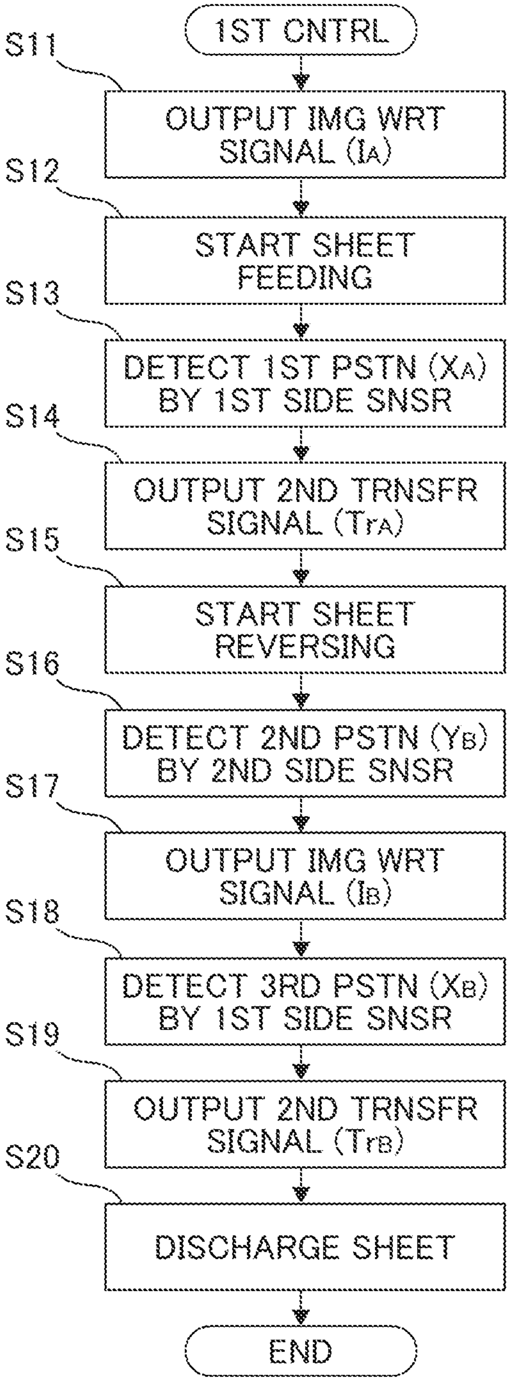

FIG. 5 is a flowchart showing an example of the first control.

Figure 6:
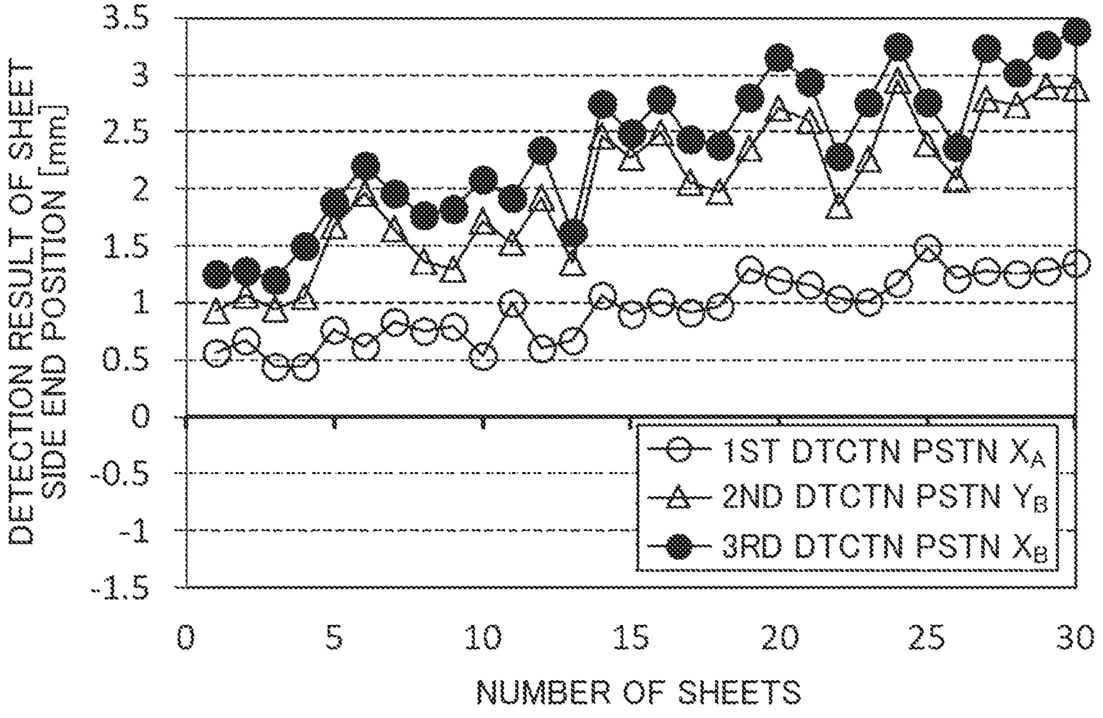

FIG. 6 is a graph showing the detection results for the first, second, and third detection positions.

Figure 7:
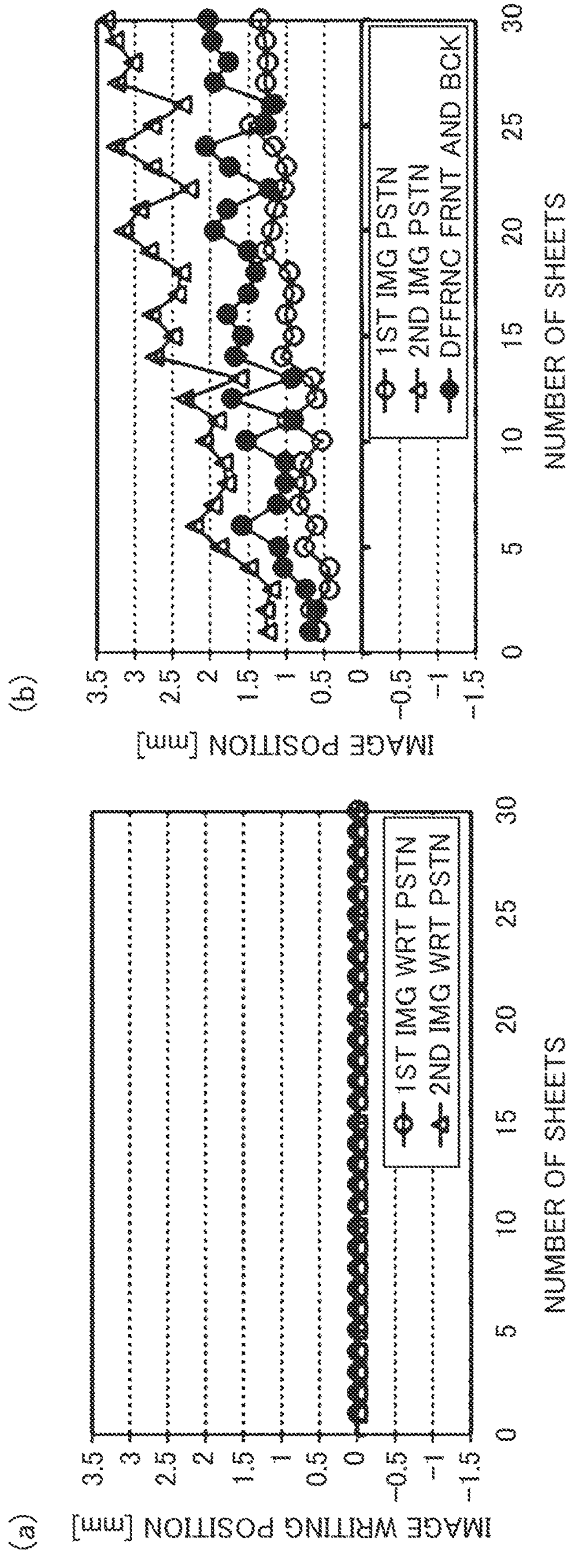

Part (a) of FIG. 7 shows the first and second image writing positions in comparative example 1, and part (b) of FIG. 7 shows the first image position, second image position, and front-to-back difference in comparative example 1.

Figure 8:
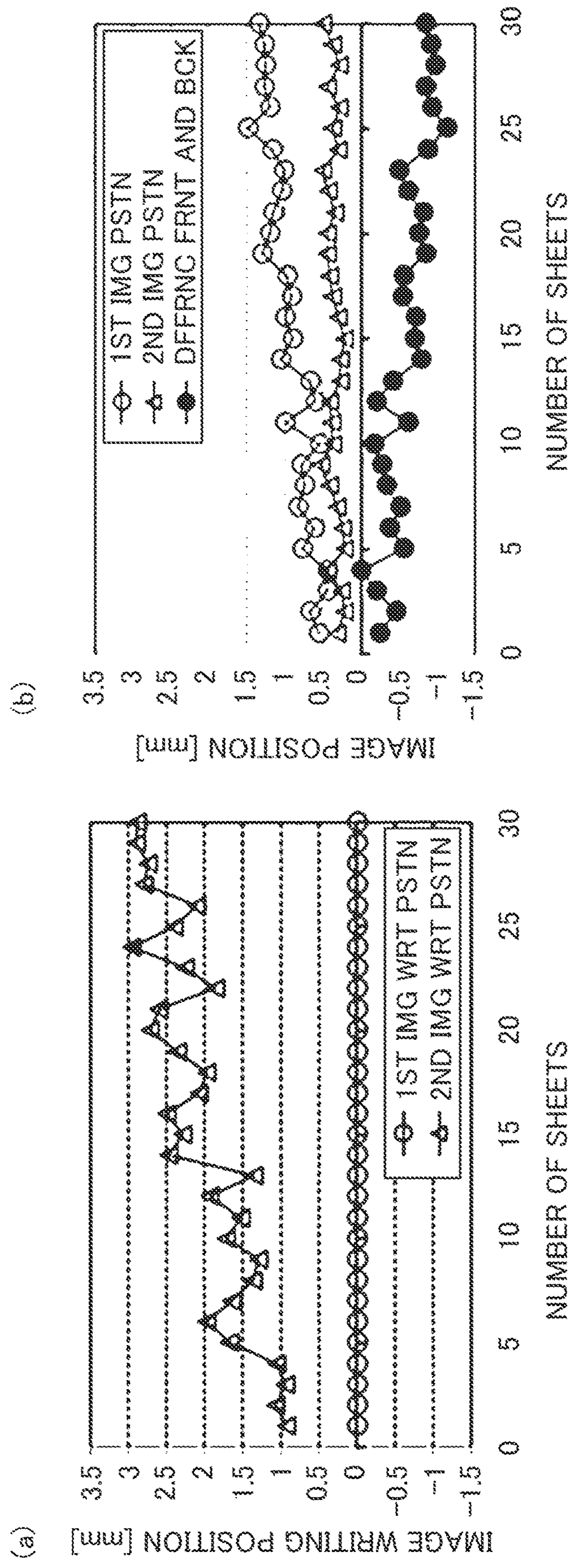

Part (a) of FIG. 8 shows the first and second image writing positions in comparative example 2, and part (b) of FIG. 8 shows the first image position, second image position, and front-to-back difference in comparative example 2.

Figure 9:
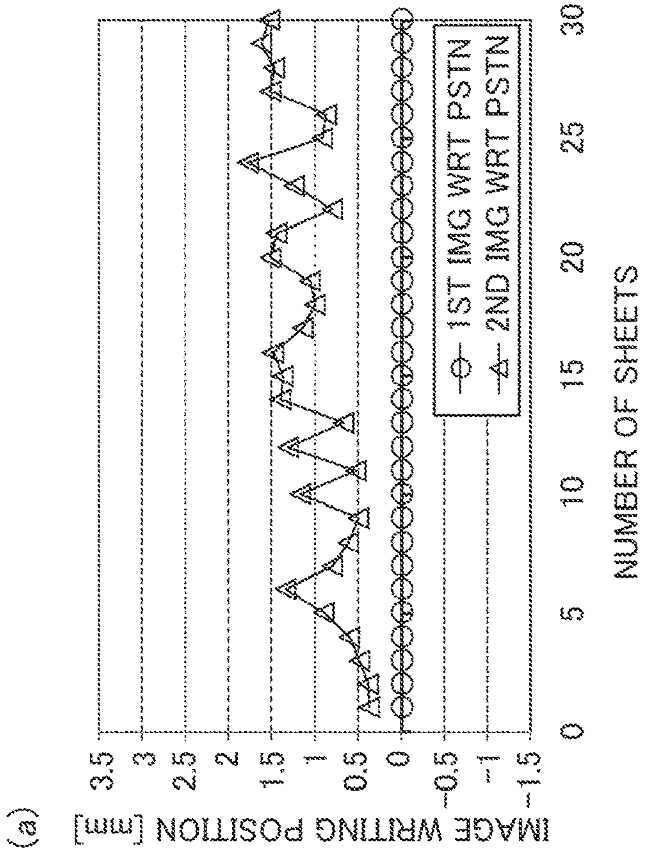
Figure 9:
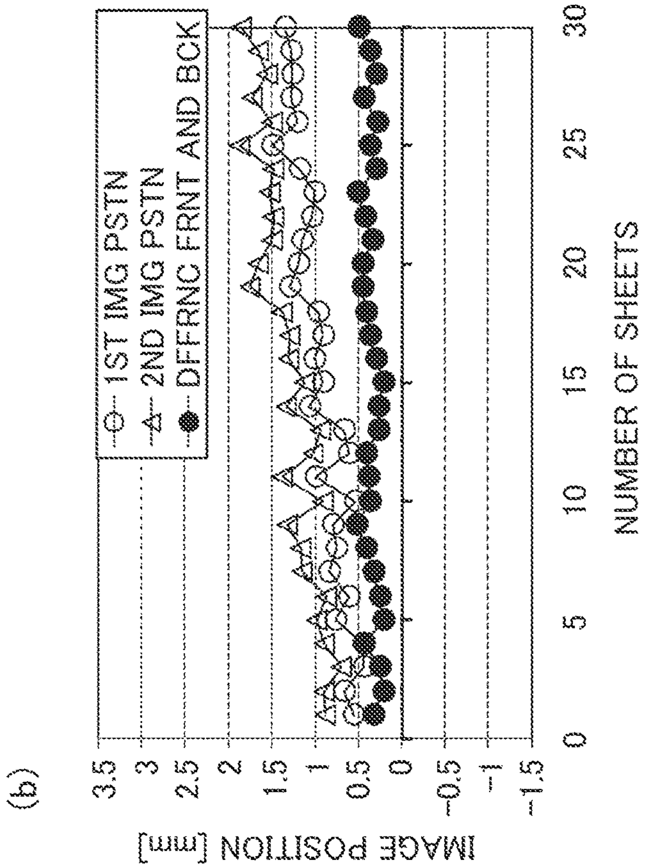

Part (a) of FIG. 9 shows the first and second image writing positions in the first control, and part (b) of FIG. 9 shows the first image position, second image position, and front-to-back difference in the first control.

Figure 10:
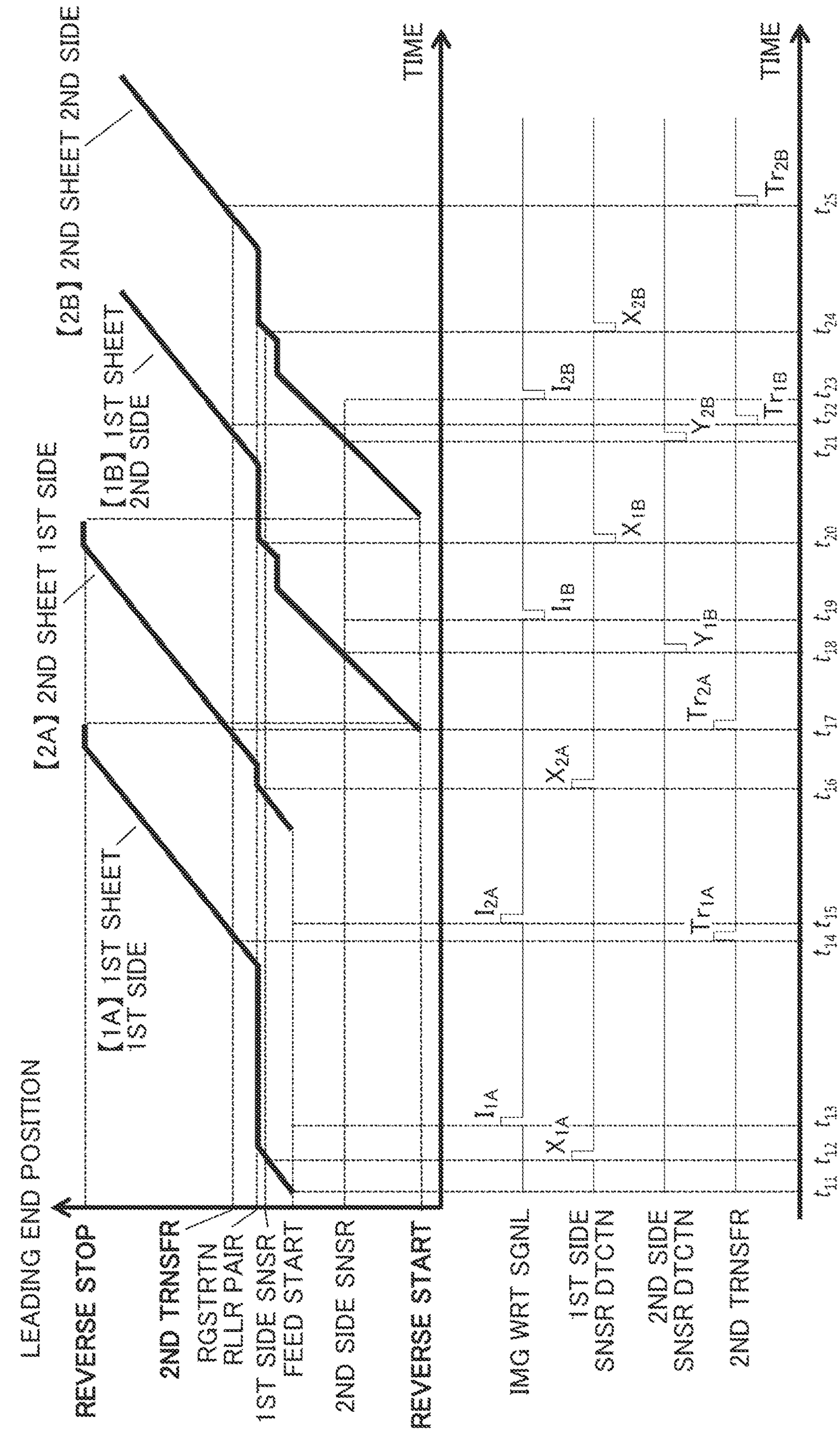

FIG. 10 shows the leading end position of a sheet being conveyed and the various control timings in the printer in the second control.

Figure 11:
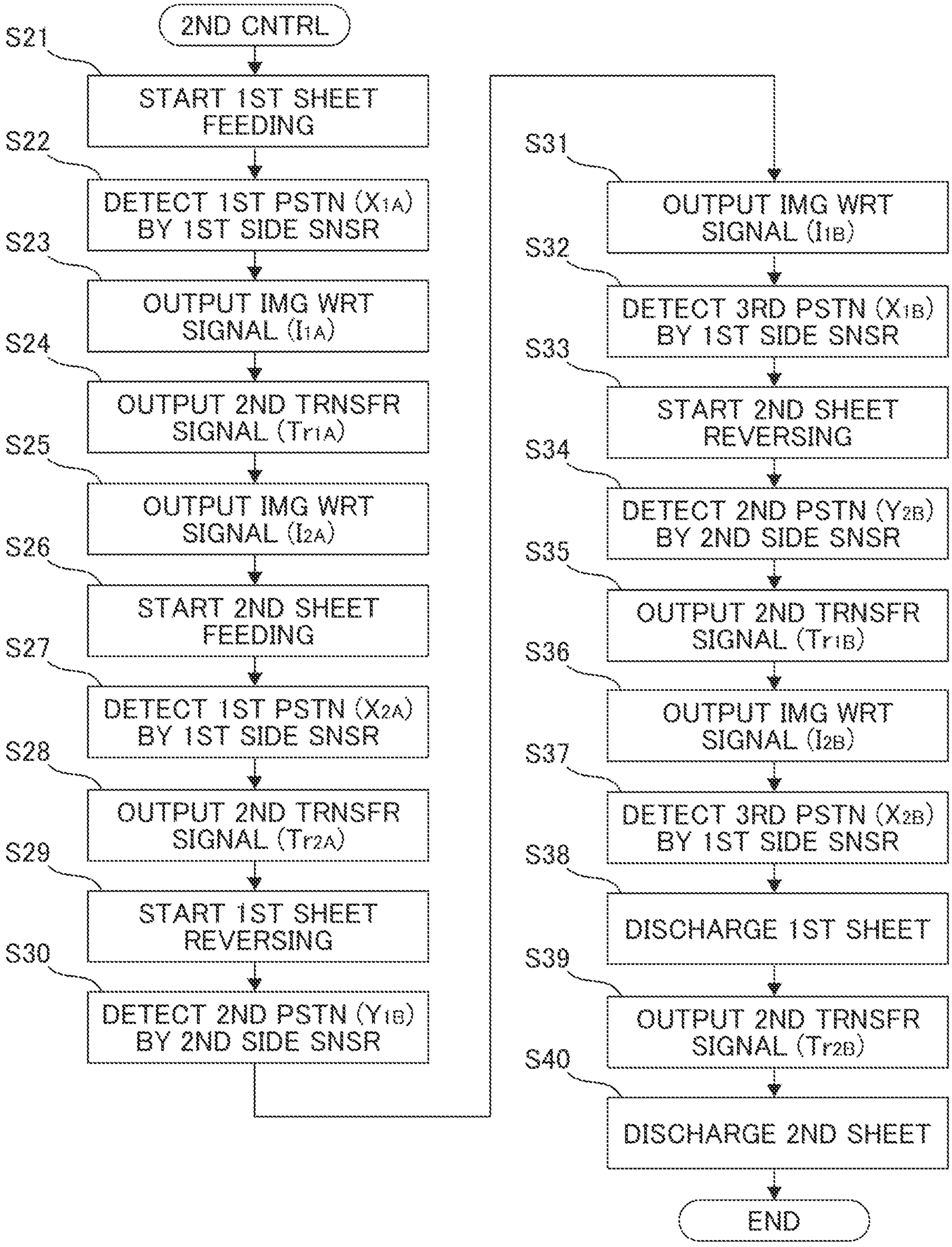

FIG. 11 is a flowchart showing an example of the second control.

Figure 12:
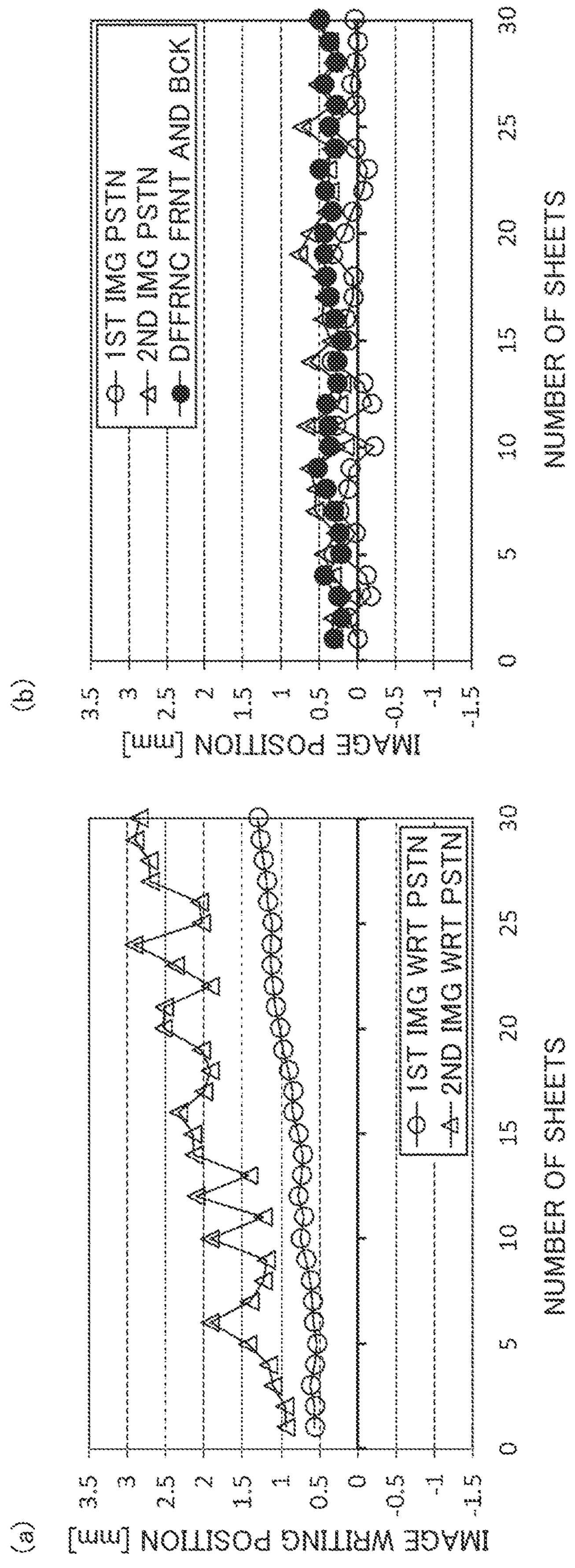

Part (a) of FIG. 12 shows the first and second image writing positions in the second control, and part (b) of FIG. 12 shows the first image position, second image position, and front-to-back difference in the second control.

Figure 13:
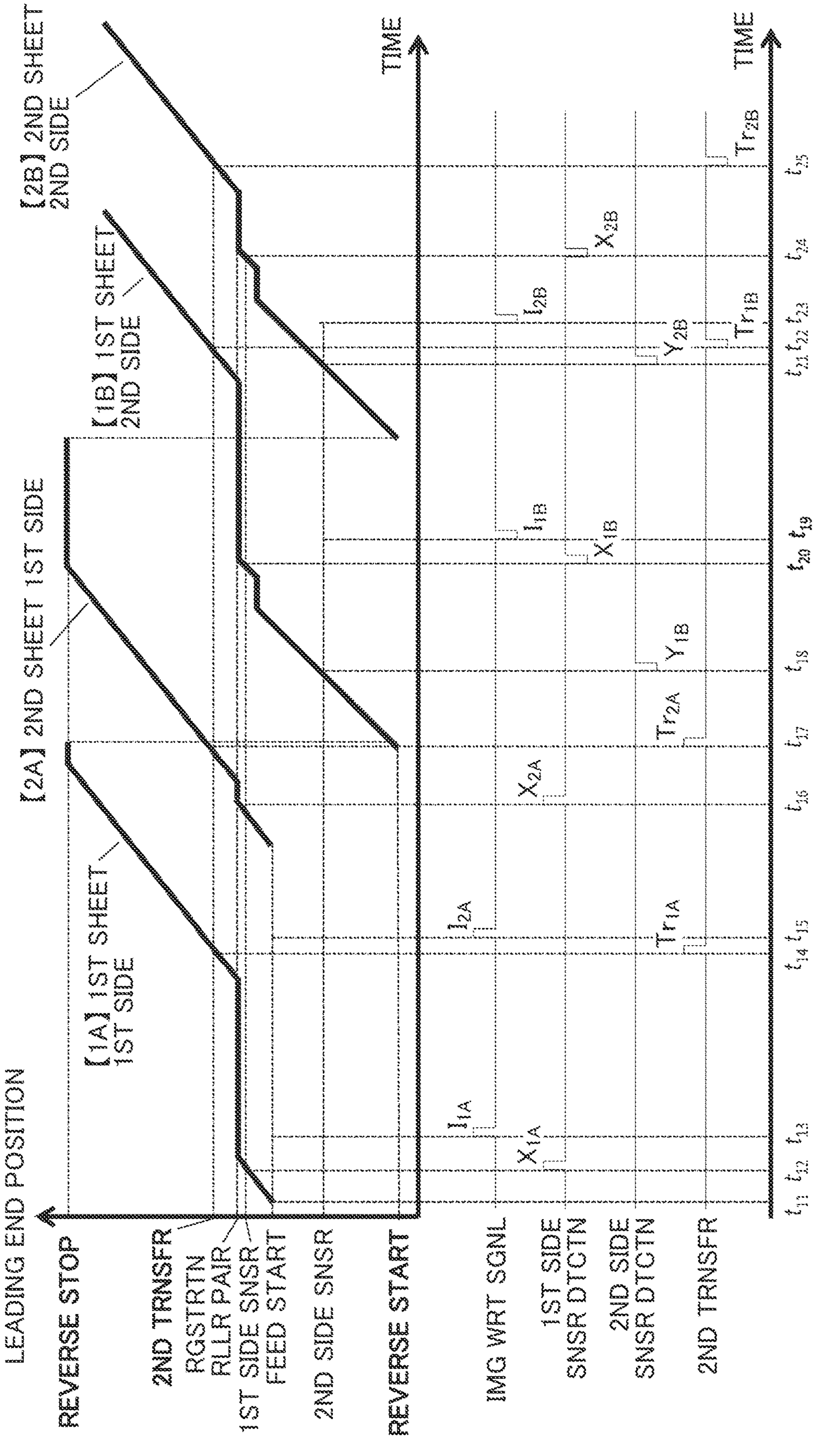

FIG. 13 shows the leading end position of a sheet being conveyed and the various control timings in the printer, according to the third control.

Figure 14:
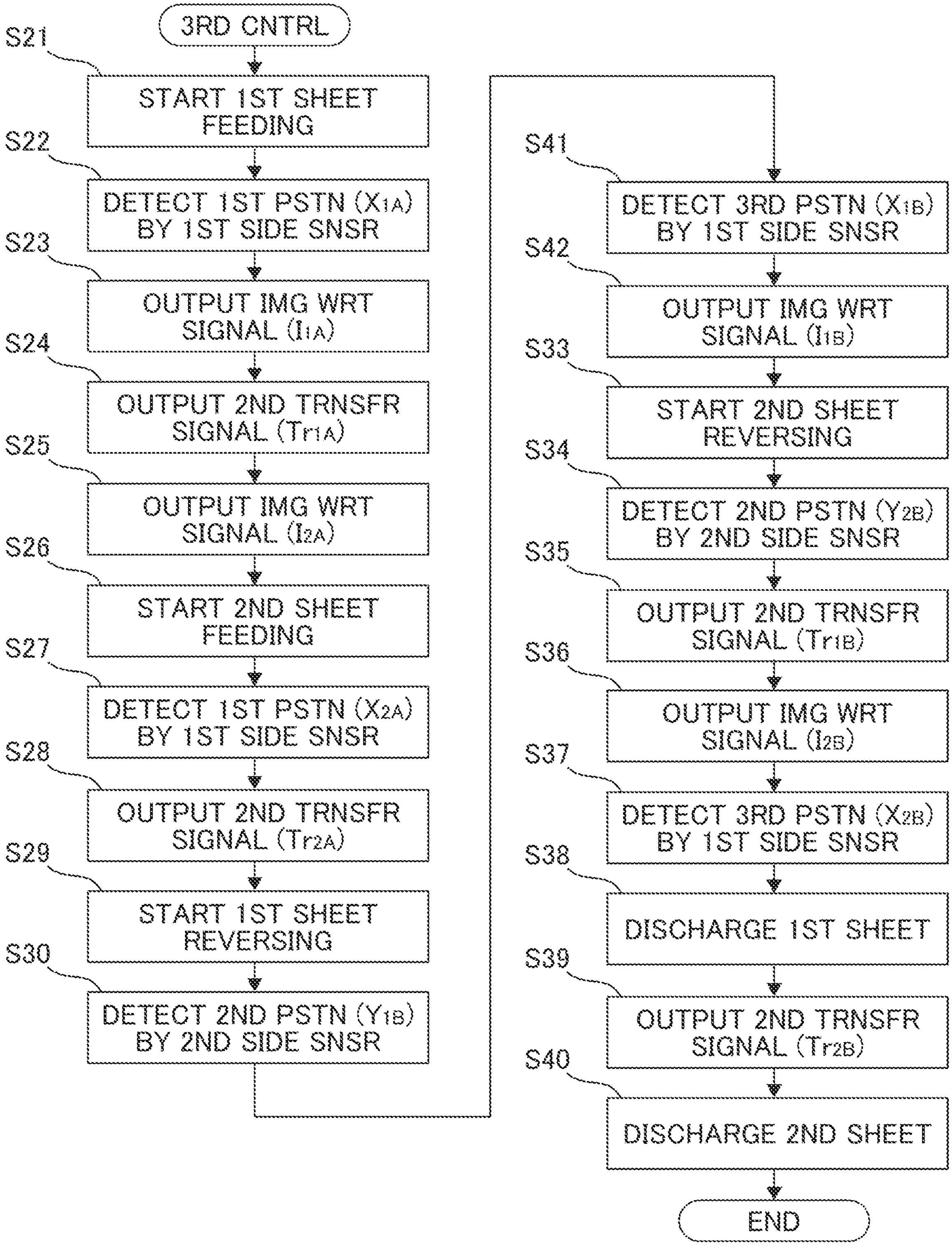

FIG. 14 is a flowchart showing an example of the third control.

Figure 15:
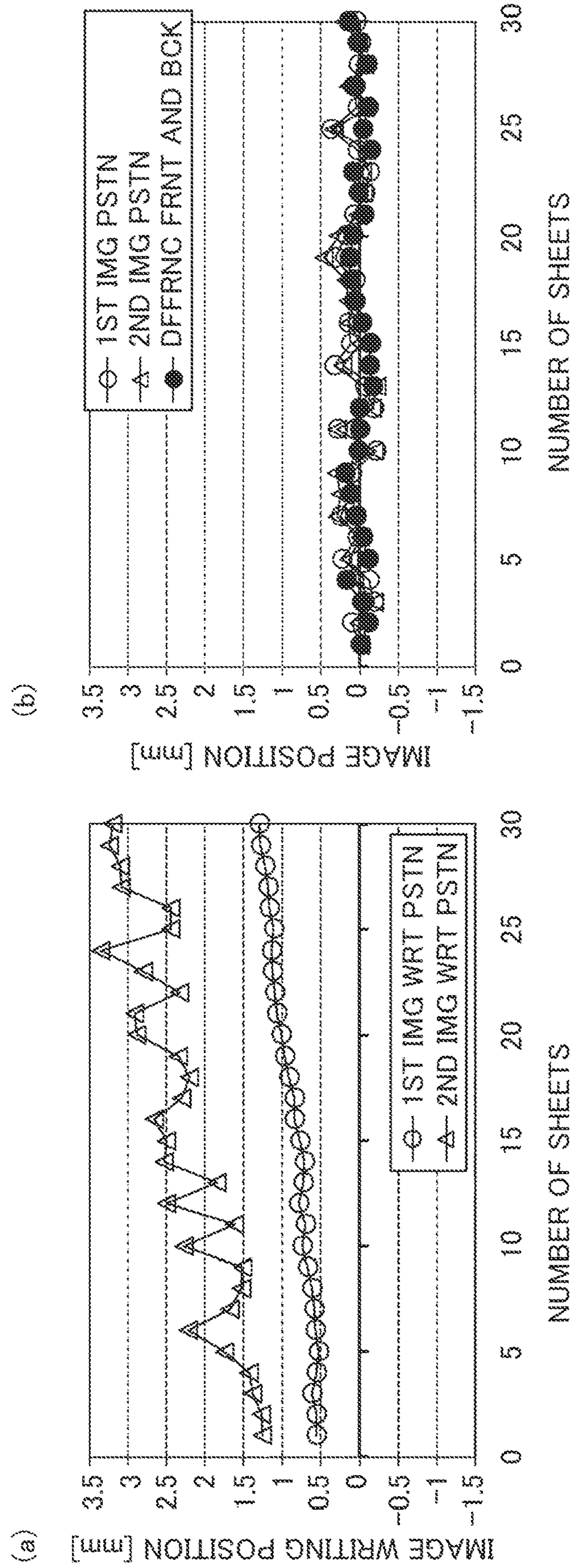

Part (a) of FIG. 15 shows the first and second image writing positions in the third control, and part (b) of FIG. 15 shows the first image position, second image position, and front-to-back difference in the third control.

DESCRIPTION OF THE EMBODIMENTS

Overall Configuration

First, embodiments of the present invention are described. A printer 100 as an image forming apparatus according to the present embodiment is an electrophotographic laser beam printer that forms an image on a sheet P used as a recording medium and outputs the image. The sheet P can be plain paper and paper such as envelopes, glossy paper, plastic film such as sheets for overhead projectors, and cloth.

The term image forming apparatus includes printers, copiers, FAX machines, and multifunctional machines, and refers to a device that forms images on sheets used as a recording medium based on image information input from an external PC or image information read from a document. In addition to a main body of the apparatus having image forming functions, an image forming apparatus may be connected to accessory devices such as optional feeders, image readers, sheet processing devices, etc. The entire system with such accessory devices connected to it is also a type of image forming apparatus.

Figure 1:
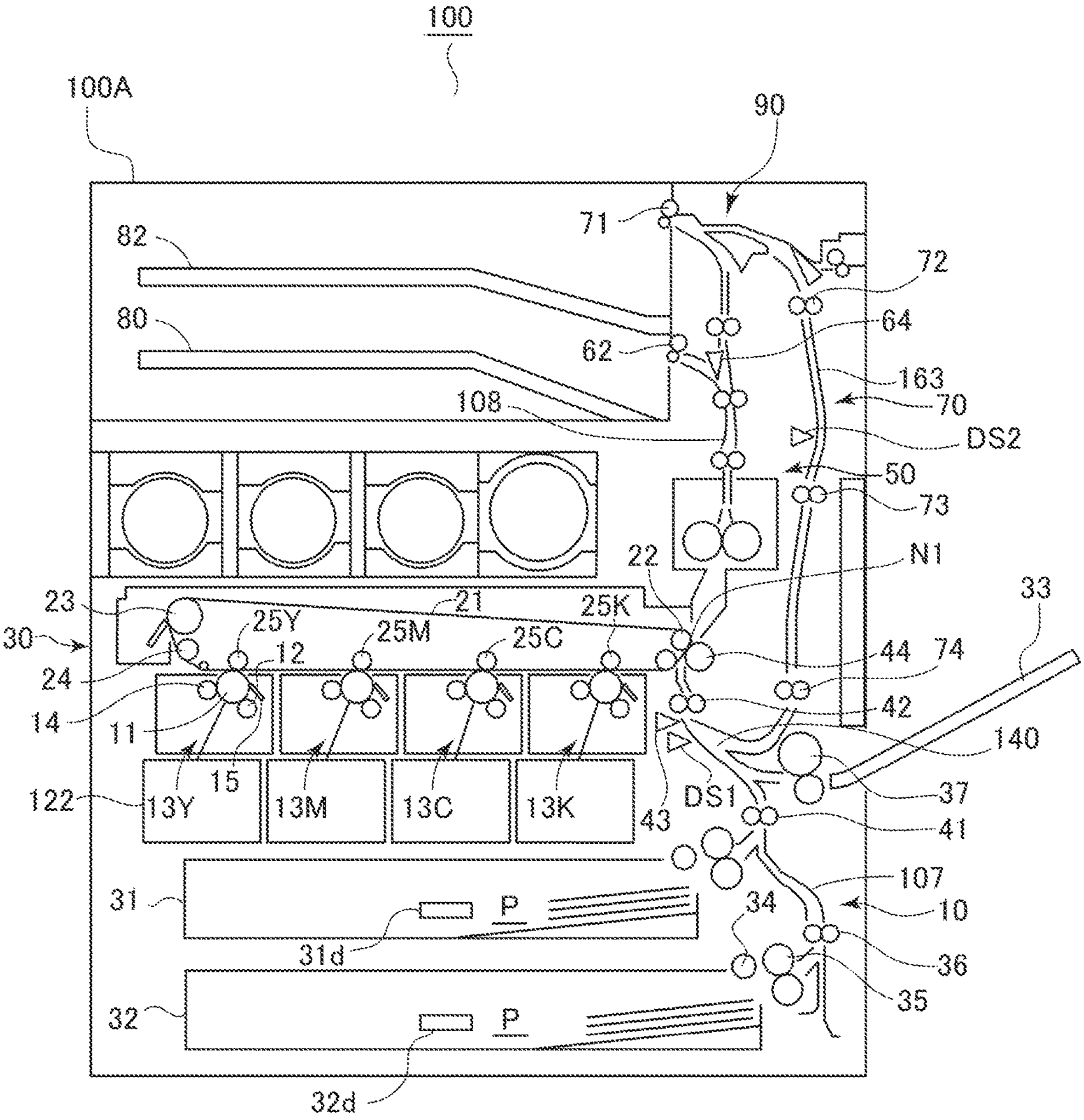
FIG. 1 is an overall schematic view of the printer.

As shown in FIG. 1, the printer 100 has an image forming portion 30 that forms an image on a sheet P, a feeding unit 10, a fixing portion 50, a re-conveyance portion 70, and a sheet discharge device 90. The image forming portion 30 has four process cartridges 13Y, 13M, 13C, 13K, each of which forms toner images in four colors: yellow (Y), magenta (M), cyan (C), and black (K), and an exposure unit 122. The image forming portion 30 also has the fixing portion 50 that fixes the toner image transferred to the sheet onto the sheet.

The four process cartridges, 13Y, 13M, 13C, and 13K, have the same configuration, except that the colors of the images to be formed are different. Therefore, only the configuration and image forming process of process cartridge 13Y will be described, and the description of process cartridges 13M, 13C, and 13K will be omitted.

The process cartridge 13Y has a photosensitive drum 11, a charging roller 12, a developing roller 14, and a cleaner 15. The photosensitive drum 11 as a photosensitive member consists of an aluminum cylinder with an organic photoconductive layer applied to its periphery, and is rotated by a driving motor (not shown). The image forming portion 30 is also provided with an intermediary transfer belt 21 that is wound around a driving roller 23, a tension roller 24, and a secondary transfer inner roller 22. Inside the intermediary transfer belt 21 as an intermediary transfer member are primary transfer rollers 25Y, 25M, 25C, 25K as primary transfer portions. In addition, a secondary transfer outer roller 44 is provided opposing the secondary transfer inner roller 22 so that the intermediary transfer belt 21 is placed between the secondary transfer rollers. The intermediary transfer belt 21 and the secondary transfer outer roller 44 form a transfer nip N1 as a transfer portion and a secondary transfer portion for transferring an image onto a sheet P.

A feeding unit 10 has cassettes 31, 32 installed in the lower part of the printer 100 to support sheets P. The sheets P supported in each cassette 31, 32 are fed by a pickup roller or other means. The cassettes 31, 32 are removably supported by the main body of the apparatus 100A of the printer 100. The feeding unit 10 is provided with sheet size detection sensors 31*d*, 32*d* that detect the size of the sheets P in the cassettes 31, 32. Since the feeding configurations for feeding sheets P supported in cassettes 31 and 32 are similar to each other, only the configuration for feeding sheets P from cassette 32 will be described here.

The feeding unit 10 has a pickup roller 34 that feeds sheets P supported in the cassette 32, and a separation roller pair 35 that separates the sheets P fed by the pickup roller 34 into single sheets. The cassette 32 is also provided with a pair of side regulation plates that regulate the position of the sheet P accommodated in the cassette 32 in the width direction, and a size detection lever that rubs against and interlocks with the side regulation plates. A sheet size detection sensor 32*d* comprises a plurality of sensors or switches (detection elements) provided at positions corresponding to the size detection levers.

When a user moves a side regulation plate according to the size of the sheet P in the cassette 32, the size detection lever moves in conjunction with the side regulation plate. When the cassette 32 is installed in the main body of the apparatus of the printer 100 in this state, the sheet size detection sensor 32*d* sends a signal according to the position of the size detection lever. This allows a control portion 200 of the printer 100 (see FIG. 2) to recognize the size of the sheet P in the cassette 32. Thus, since the sheet size detection sensor 32*d* can detect the size of the sheet P in the cassette 32, the control portion 200 can control the image forming portion 30 to form an image on an appropriate range of the sheet P.

The sheet size detection sensors 31*d* and 32*d* are configured to detect the attachment and removal of cassettes 31 and 32. For example, when the cassette 32 is removed from the main body of the apparatus, all of the multiple detection elements of the sheet size detection sensor 32*d* are turned off. A manual feed tray 33 may also be equipped with a sheet size detection sensor similar to the sheet size detection sensors 31*d* and 32*d*.

Next, the image forming operation of the printer 100 configured in this manner is described. When an image signal is input to an exposure unit 122 from a PC (not shown) or a reading unit, a laser light corresponding to the image signal is irradiated from the exposure unit 122 as the exposure portion onto the photosensitive drum 11 of the process cartridge 13Y.

At this time, the surface of the photosensitive drum 11 is uniformly charged to a predetermined polarity and potential by the charging roller 12, and a latent electrostatic image is formed on the surface by irradiating a laser light from the exposure unit 122. The electrostatic latent image formed on the photosensitive drum 11 is developed by the developing roller 14 as the developing portion, and a yellow (Y) toner image is formed on the photosensitive drum 11.

In a similar manner, each photosensitive drum of process cartridges 13M, 13C, and 13K is irradiated with a laser light from the exposure unit 122 to form a magenta (M), cyan (C), and black (K) toner image on each photosensitive drum. The toner images of each color formed on each photosensitive drum are transferred to the intermediary transfer belt 21 by primary transfer rollers 25Y, 25M, 25C, 25K, and are conveyed to the transfer nip N1 by the intermediary transfer belt 21 rotating by the driving roller 23. The image formation process for each color is timed to overlay the upstream toner image that has been primarily transferred onto the intermediary transfer belt 21. Any residual transfer toner remaining on the photosensitive drum 11 after the transfer is removed by the cleaner 15.

In parallel with this image forming process, sheets P accommodated in the cassette 32 of the feeding unit 10 are fed into a feeding conveyance path 107 by a pickup roller 34 and separated one by one by a separation roller pair 35. The feeding unit 10 may feed sheets P using a belt system in which sheets P are adsorbed and conveyed on a belt member by a vacuum fan, or using a friction separation feeding method using pads.

The sheet P is then conveyed by conveyance roller pairs 36, 41, etc., and its skew is corrected when it abuts against the nip of a registration roller pair 42, which is at a standstill. The registration roller pair 42 conveys the sheet P at a predetermined conveyance timing in accordance with the image transfer timing at the transfer nip N1. The printer 100 has a manual feed tray 33 on which a sheet P is placed, and the sheet P placed on the manual feed tray 33 may be fed by a manual feed portion 37.

A registration sensor 43 and a first side end sensor DS1 are located upstream of the registration roller pair 42 in the sheet feeding direction. The registration sensor 43 detects the leading end of the sheet S being conveyed. The registration roller pair 42 is driven and the stop timing is determined based on the detection result of the registration sensor 43. In other words, the registration roller pair 42 as a conveyance section conveys the sheet P in accordance with the image forming portion timing. The first side end sensor DS1 detects the position of the end of the sheet P being conveyed in the width direction.

The first side end sensor DS1 is positioned closer to the transfer nip portion N1 than a confluence 170 of the feeding conveyance path 107 and a double-sided conveyance path 163. In other words, the first side end sensor DS1 can detect both the position of the side end of the sheet P that passes through the feeding conveyance path 107 to the transfer nip N1 and the position of the side end of the sheet P that passes through the double-sided conveyance path 163 to the transfer nip N1.

The full-color toner image on the intermediary transfer belt 21 is transferred to the sheet P at the transfer nip N1 as the transfer portion by a secondary transfer bias applied to a secondary transfer outer roller 44. The sheet P on which the toner image has been transferred is sent to a fixing feeding path 108, where the toner is melted and solidified (fixed) by applying the prescribed heat and pressure by a fixing portion 50. The sheet P that has passed through the fixing portion 50 is conveyed to the sheet discharge device 90. The sheet discharge device 90 changes the conveying destination of the sheet P by means of a guide member 64, etc., and discharges the sheet P to one of the discharge trays 80, 82 by means of a discharge roller pair 62 and a discharge reversing roller pair 71.

When a double-sided printing job in which images are formed on both side surfaces of a sheet P is input, the sheet P with an image formed on its surface by the transfer nip N1 is guided to the discharge reversing roller pair 71 by the guide member 64. The discharge reversing roller pair 71 switches back the sheet P, thereby conveyance roller pair 71 conveys the sheet P to a double-sided conveyance path 163.

The re-conveyance portion 70 has a plurality of conveyance roller pairs 72, 73, 74 that are positioned along the double-sided conveyance path 163. By these plurality of conveyance roller pairs 73, 74, the sheet P is conveyed again through the double-sided conveyance path 163 to the feeding conveyance path 107.

A second side end sensor DS2 is located between a conveyance roller pair 72 and a conveyance roller pair 73 in the double-sided conveyance path 163. The second side end sensor DS2 detects the position of the end in the width direction of the sheet P feeding direction in the double-sided conveyance path 163. The sheet P that is re-conveyed to the feeding conveyance path 107 has an image formed on the reverse side by the transfer nip N1, and is discharged by the sheet discharge device 90 to one of the discharge trays 80, 82.

The printer 100, according to the present embodiment, is configured to convey a sheet P by aligning the center of the sheet P in the width direction perpendicular to a sheet conveyance direction in the feeding conveyance path 107, a fixing feed path 108, and a double-sided conveyance path 163, as one configuration example. In other words, the explanation will proceed assuming that the printer 100 adopts the center-based sheet conveyance method.

The side regulation plates in cassettes 31 and 32 are designed to prevent skew and misalignment of sheet P in the width direction during sheet P feeding and in each roller pair in the feeding conveyance path 107. In practice, however, a small gap may occur between the side control plate and the sheet P. This gap may cause the sheet P to be skewed or misaligned in the width direction during feeding and conveying.

Thus, when sheets P are loaded into cassettes 31 and 32, the center position of the sheet P in the width direction may shift from the center position of each conveyance path due to the rattling of the side regulation plates or vibration caused by inserting and removing cassettes 31 and 32. Furthermore, the dimensions of the sheet P itself may differ slightly from the nominal size due to cutting errors or other reasons. Then, the sheet P fed from cassettes 31 and 32 will continue to be conveyed in a direction deviating from the standard position in the width direction.

In such a case, when the toner image formed on the photosensitive drum 11 with the center reference is transferred to sheet P at the transfer nip N1, the center of sheet P and the center of the toner image on sheet P are offset in the width direction.

[Control System]

Figure 2:
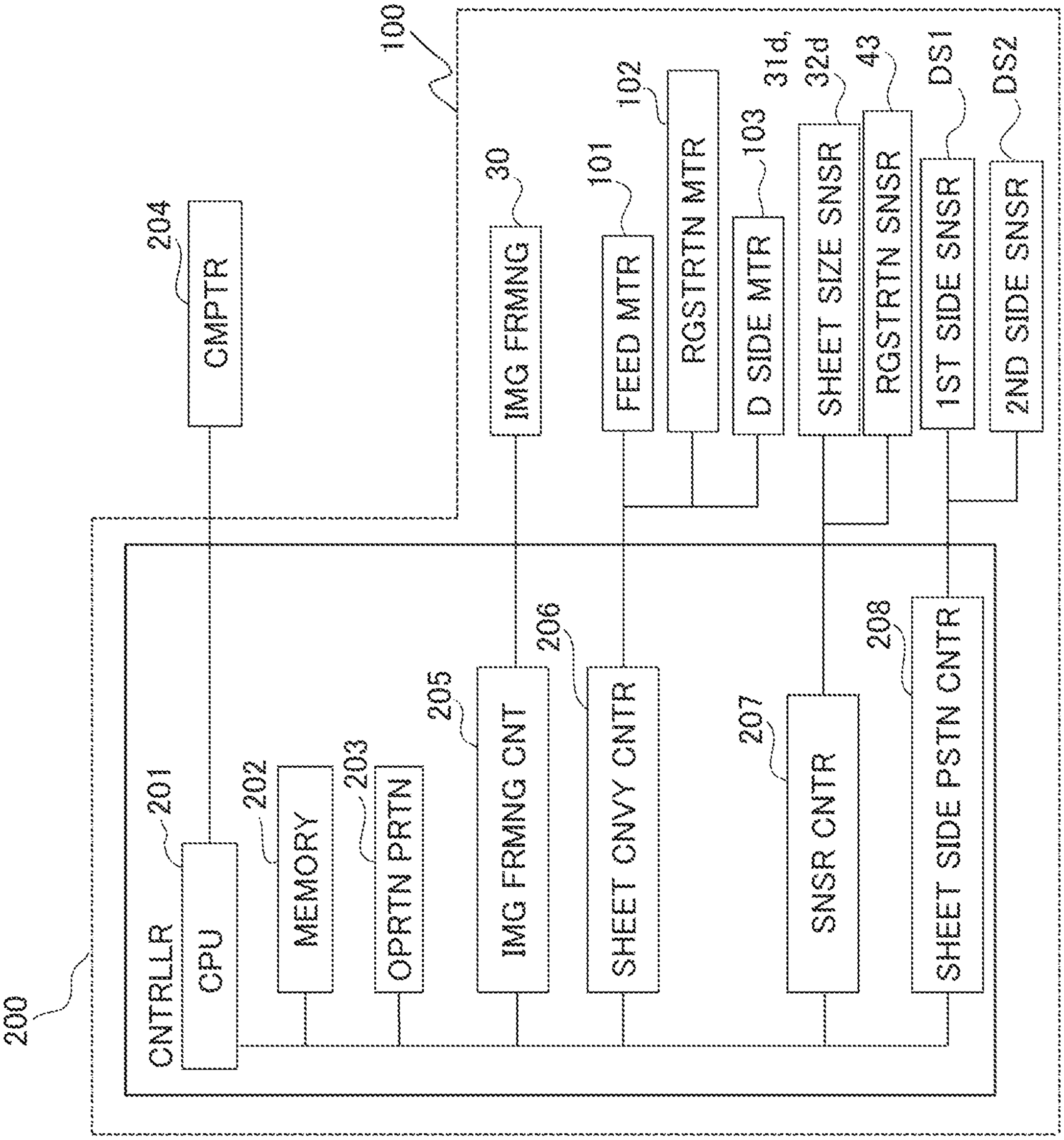
FIG. 2 is a block diagram showing the control system of the printer.

FIG. 2 is a block diagram showing the control system of the printer 100. As shown in FIG. 2, the printer 100 has a control portion 200, which has a CPU 201 and a memory 202. Furthermore, the control portion 200 has various functional portions, including an image forming control portion 205, a sheet conveyance control portion 206, a sensor control portion 207, and a sheet side end position control portion 208.

CPU (Central Processing Unit) 201 realizes various processes performed by the printer 100 by executing predetermined control programs, etc. The memory 202 is, for example, RAM (Random Access Memory), ROM (Read Only Memory), etc., and stores various programs and various data in predetermined ranges. The operating portion 203 accepts various operations performed by the user, such as various information about the sheet to be used for printing (size information, basis weight information, surface quality information, etc.) and instructions for printing or its interruption.

The image forming control portion 205 gives instructions to an image forming portion 30, including the exposure unit 13, to control image forming. The sheet conveyance control portion 206 gives instructions to a feeding motor 101, a registration motor 102, and a double-sided motor 103, etc., to control the conveyance of sheets P. The feeding motor 101 drives the pickup roller 34, separation roller pair 35, conveyance roller pairs 36 and 41, discharge roller pair 62, and discharge reversing roller pair 71. The registration motor 102 drives a registration roller pair 42. The double-sided motor 103 drives conveyance roller pairs 72, 73, 74, etc.

The sensor control portion 207 controls the start or stop of detection of sheet size detection sensors 31*d*, 32*d*, registration sensor 43, etc., and also accepts the detection results of each sensor. The sheet side end position control portion 208 accepts the detection signal values of the first side end sensor DS1 and the second side end sensor DS2 and converts them to sheet side end positions.

The control portion 200 can be connected to an external computer 204 via a network, for example, and can be configured to receive various information about the sheets to be used for printing via the computer 204.

[First and Second Side End Sensors]

Next, the first side end sensor DS1 and the second side end sensor DS2 are described in detail using parts (a) through (c) of FIG. 3. In the present embodiment, the first side end sensor DS1 and the second side end sensor DS2 each consist of a CIS (Contact Image Sensor), but are not limited to this. For example, the first side end sensor DS1 and the second side end sensor DS2 may comprise a CCD (Charge Coupled Device) sensor. Each of the first side end sensor DS1 and the second side end sensor DS2 may have a sensor that detects the presence or absence of a sheet and a driving motor that moves the sensor in the width direction W. The side end position may be calculated from the driving motor's driving amount until the sensor detects a side end Ps of the sheet P.

As shown in part (a) of FIG. 3, the first side end sensor DS1 is positioned between the conveyance roller pair 41 and the registration roller pair 42 in the conveyance direction CD and near the registration roller pair 42. As a result, even when the leading end of the sheet P abuts against the registration roller pair 42 and the skew of the sheet P is corrected, the position of the side end Ps of the sheet P (hereinafter simply referred to as the side end position) can be accurately detected by the first side end sensor DS1.

The first side end sensor DS1 detects the side end position of the sheet P that is conveyed through the feeding conveyance path 107 and before the toner image is transferred to a first surface of the sheet P. The first side end sensor DS1 is positioned on one side in the width direction W relative to a center line CL in the width direction W of the feeding conveyance path 107. This is because it is sufficient to detect the position of one side end Ps of the sheet P to detect the position of the sheet P in the width direction W.

As shown in part (b) of FIG. 3, the second side end sensor DS2 is positioned between the conveyance roller pair 72 and the conveyance roller pair 73 in the sheet conveyance direction CD and on one side in the width direction W relative to the center line CL in the width direction W of the double-sided conveyance path 163. In other words, the second side end sensor DS2 is positioned on the same side as the first side end sensor DS1 with respect to the center line CL. The second side end sensor DS2 first detects the side end position of a sheet P that is conveyed on the double-sided conveyance path 163, i.e., after the toner image is transferred on the first surface but before the toner image is transferred on a second surface.

Furthermore, the first side end sensor DS1 detects the side end position of the sheet after the toner image is transferred on the first surface but before the toner image is transferred on the second surface, as shown in part (c) of FIG. 3.

The control portion 200 calculates the nominal position, i.e., the amount of deviation between the design target position and the detection result, based on the detection results of the first side end sensor DS1 and the second side end sensor DS2. In the present embodiment, the side end position of the sheet P when the center of the sheet P coincides with the center line CL is the reference position (nominal position) and is denoted as "O" in parts (a) through (c) of FIG. 3.

The control portion 200 of the present embodiment performs a first control when a sheet is fed from the cassette 31, a second control when a sheet is fed from the cassette 32, and a third control when a sheet is fed from a manual feed tray 33. In other words, the control portion 200 has the first control as the first mode, the second control as the second mode, and the third control as the third mode. The first through third controls are explained below.

<First Control>

In the following description of the first control, the side end position of the sheet P detected by the first side end sensor DS1 as the first detection portion before image forming on the first surface of the sheet P is referred to as a first detection position $X_A$. The side end position of the sheet P detected by the second side end sensor DS2 as the second detection portion after image forming on the first surface of the sheet P but before image forming on the second surface of the sheet P is designated as a second detection position $Y_B$. The side end position of the sheet P detected by the first side end sensor DS1 after the image is formed on the first surface of the sheet P but before the image is formed on the second surface is designated as a third detection position $X_B$. These first detection position $X_A$, second detection position $Y_B$ and third detection position $X_B$ can also be said to be positions in the width direction W of the sheet P. For example, in the following, the first detection position $X_A$, the second detection position $Y_B$, and the third detection position $X_B$ are defined with the convention of the left side of the paper being the plus side and the right side of the paper being the minus side with respect to the reference position ("0").

The first side end sensor DS1 and the second side end sensor DS2 are configured to detect the respective side ends Ps of the smallest and largest width sheet sizes available for the printer 100. Furthermore, at the positions where the first and second side end sensors DS1 and DS2 are located, the gap between the pair of conveyance guides forming the conveyance path shall be uniform. It is desirable that a space be provided between the first side end sensor DS1 and the conveyance roller pair 41 in the sheet conveyance direction CD, such that the deflection formed in the sheet P during skew correction can be accommodated.

[Control Timing]

FIG. 4 shows the leading end position of a sheet P during conveying and various control timings in the printer 100. In the upper part of FIG. 4, the horizontal axis shows the time and the vertical axis shows the leading end position of a sheet P during conveying. In the lower part of FIG. 4, the secondary transfer timing, the detection timing of the first side end sensor DS1, the detection timing of the second side end sensor DS2, and the timing of the image forming to the photosensitive drum 11 by the exposure unit 122 are shown. In FIG. 4, the signal for controlling the transfer of the toner image to the first surface of the sheet P (hereinafter referred to as the secondary transfer signal) is shown as $Tr_A$, and the signal for controlling the transfer of the toner image to the second surface of the sheet P is shown as $Tr_B$.

Since the printer 100 is an intermediary transfer tandem type image forming apparatus, the full-color toner image is transferred to the sheet P at the transfer nip N1 after going through the image forming process for each color in the process cartridges 13Y, 13M, 13C, 13K. Therefore, it takes a relatively long time from the start of the image forming process to the transfer of the toner image onto the sheet P at the transfer nip N1.

On the other hand, the first side end sensor DS1 is located near the registration roller pair 42 and is relatively close to the transfer nip N1. Therefore, a time $t_2$ at which the first detection position $X_A$ of the sheet P is detected by the first side end sensor DS1 is later than a time $t_1$ at which the electrostatic latent image corresponding to the toner image formed on the first surface is written onto the photosensitive drum 11 by the exposure unit 122. In other words, before the first detection position of the sheet P is detected by the first side end sensor DS1, the formation of the electrostatic latent image on the photosensitive drum 11 has already started by the exposure unit 122. Therefore, the control portion 200 cannot determine a first image writing position $I_A$ based on the first detection position $X_A$. The first image writing position $I_A$ is the position in the width direction W of the electrostatic latent image to be written on the photosensitive drum 11 to form the toner image to be transferred to the first surface of the sheet P.

The second side end sensor DS2 is located in the double-sided conveyance path 163, and the distance between the second side end sensor DS2 and the transfer nip N1 is relatively long in a sheet conveyance direction CD. Therefore, a time $t_5$ when the electrostatic latent image corresponding to the toner image formed on the second side is written on the photosensitive drum 11 by the exposure unit 122 is later than the time $t_2$ when the second detection position $Y_B$ of the sheet P is detected by the second side end sensor DS2. This is because even if the electrostatic latent image corresponding to the toner image to be formed on the second side is written into the photosensitive drum 11 by the exposure unit 122 after the time $t_2$, it is sufficiently late for a time $t_7$ when the toner image is transferred to the second surface of the sheet P.

The toner image formed on the first surface and the toner image formed on the second surface constitute the first toner image and the second toner image, respectively. These first and second toner images are formed by developing the first and second electrostatic latent images on the photosensitive drum 11.

Furthermore, a time $t_5$ is later than the time $t_2$ when the first detection position $X_A$ of the sheet P is detected by the first side end sensor DS1. Therefore, the control portion 200 can determine the second image writing position $I_B$ of the electrostatic latent image to be transferred to the sheet P based on the first detection position $X_A$ and the second detection position $Y_B$ of the sheet P. The second image writing position $I_B$ is the position in the width direction W of the electrostatic latent image to be written on the photosensitive drum 11 to form the toner image to be transferred to the second surface of the sheet P.

Thus, in the first control, the first image writing position $I_A$ of the electrostatic latent image corresponding to the toner image to be transferred to the first surface of the sheet P is determined before it is detected at the first detection position $X_A$. In the first control, the second image writing position $I_B$ of the electrostatic latent image corresponding to the toner image to be transferred to the second surface of the sheet P is determined based on the first detection position $X_A$ and the second detection position $Y_B$, as well as the first image writing position $I_A$.

It goes without saying that a time to when the third detection position $X_B$ of the sheet P is detected by the first side end sensor DS1 is after the time $t_5$ when the electrostatic latent image corresponding to the toner image formed on the second surface is written on the photosensitive drum 11 by the exposure unit 122.

FIG. 5 is a flowchart showing an example of the first control described in FIG. 4. First, the control portion 200 outputs an image writing signal for the first surface to the exposure unit 122 so that a toner image is written to the first image writing position $I_A$ of the photosensitive drum 11 (step S11), as shown in FIG. 5. Then, the control portion 200 starts feeding the sheet P accommodated in a cassette 31 (step S12). Thereafter, the first detection position $X_A$ (end portion of the first surface) of the sheet P is detected by the first side end sensor DS1 (step S13), and the control portion 200 outputs the secondary transfer signal $Tr_A$ to transfer the toner image on the first surface of the sheet P (step S14). When the secondary transfer signal $Tr_A$ is output, the toner image on the intermediary transfer belt 21 is transferred to the first surface of the sheet P at the transfer nip N1.

Then, the control portion 200 starts reversing the sheet P by the discharge reversing roller pair 71 to transfer the image to the second surface of the sheet P (step S15). Thereafter, the second detection position $Y_B$ (end portion of the second surface) of the sheet P is detected by the second side end sensor DS2 (step S16). The control portion 200 outputs an image writing signal for the second side to the exposure unit 122 so that a toner image is written at the second image writing position $I_B$ of the photosensitive drum 11 (step S17). The second image writing position $I_B$ is determined based on the first detection position $X_A$, the second detection position $Y_B$ and the first image writing position $I_A$. The third detection position $X_B$ of the sheet P is detected by the first side end sensor DS1 (step S18), and the control portion 200 outputs the secondary transfer portion signal $Tr_B$ to transfer the toner image to the second surface of the sheet P (step S19). When the secondary transfer signal $Tr_B$ is output, the toner image on the intermediary transfer belt 21 is transferred to the second surface of the sheet P at the transfer nip N1. The sheet P is then discharged to one of the discharge trays 80, 82 by a sheet discharge device 90 (step S20).

FIG. 6 shows the detection results of the first detection position $X_A$, the second detection position $Y_B$, and the third detection position $X_B$ in a double-sided printing job in which 30 sheets are continuously printed on both surfaces. In FIG. 6, "○" indicates the first detection position, "Δ" indicates the second detection position, and "." indicates the third detection position. These first detection position $X_A$, second detection position $Y_B$ and third detection position $X_B$ are shown as the distance in the width direction W from the reference position "0" shown in parts (a) through (c) of FIG. 3.

As shown in FIG. 6, the first detection position $X_A$ shows not only short-term variation but also a somewhat long-term rightward transitional variation due to, for example, rattling between the side regulation plate of the cassette 32 and the sheet.

The second detection position $Y_B$ has a waveform that looks as if short-term variations are further superimposed on the first detection position $X_A$. This is due to the addition of variations caused by the fact that only the discharge reversing roller pair 71 nips the sheet P and performs switchback, as well as variations related to the perpendicularity of the sheet P itself due to cutting errors and other factors.

Furthermore, the waveform is such that the third detection position $X_B$ is offset from the second detection position $Y_B$ by a near constant value. It is known that this is mainly caused by the misalignment in the width direction W of the sheet P when the sheet P is conveyed from the second side edge sensor DS2 to the first side end sensor DS1.

Comparison Example 1

Part (a) of FIG. 7 is a graph showing the first image writing position $I_A$ and the second image writing position $I_B$ in comparative example 1 for a double-sided printing job in which 30 sheets are continuously printed on both surfaces. Part (b) of FIG. 7 is a graph showing a first image position $L_A$, a second image position $L_B$, and a front-to-back difference ΔL in comparative example 1. The first image position $L_A$ is the position in the width direction W of the toner image transferred to the first surface of the sheet P. The second image position $L_B$ is the position in the width direction W of the toner image transferred to the second surface of the sheet P. The front-to-back difference ΔL is the difference between the first image position $L_A$ and the second image position $L_B$ in the width direction W. These first image position $L_A$ and second image position $L_B$ are considered to be the reference position, or "0", which is the image printing position when the center of the sheet P in the width direction W and the center of the image on the sheet P coincide.

In part (a) of FIG. 7, "○" indicates the first image writing position $I_A$ and "Δ" indicates the second image writing position $I_B$. These are the same in part (a) of FIG. 8, part (a) of FIG. 9, part (a) of FIG. 12 and part (a) of FIG. 13, which are described below. In part (b) of FIG. 7, "○" indicates the first image position $L_A$, "Δ" indicates the second image position $L_B$, and "●" indicates the front-to-back difference ΔL. These are the same in part (b) of FIG. 8, part (b) of FIG. 9, part (b) of FIG. 12, and part (b) of FIG. 13, which are described below.

In Comparative example 1, as shown in part (a) of FIG. 7, the first image writing position $I_A$ and the second image writing position $I_B$ are not offset from the reference position, and the image writing positions for the toner images transferred to the first and second surfaces, respectively, are not corrected. Therefore, as shown in part (b) of FIG. 7, the first image position $L_A$ is almost the same as the first detection position $X_A$, and the second image position $L_B$ is almost the same as the second detection position $Y_B$. The second image position $L_B$ is approximately 3.5 mm at maximum, but the front-to-back difference ΔL is approximately 2.0 mm at maximum. The front-to-back difference ΔL in Comparative example 1 is considered to be the amount by which the sheet P is displaced in the width direction W during conveying the sheet P from the transfer of the toner image on the first surface to the transfer of the toner image on the second surface.

Comparative Example 2

Part (a) of FIG. 8 is a graph showing the first image writing position $I_A$ and the second image writing position $I_B$ in comparative example 2 in the double-sided printing job in which 30 sheets are continuously printed on both surfaces. Part (b) of FIG. 8 shows the first image position $L_A$, the second image position $L_B$, and the front-to-back difference ΔL in comparative example 2.

In Comparative example 2, as shown in part (a) of FIG. 8, the first image writing position $I_A$ is not offset from the reference position, but the second image writing position $I_B$ is offset from the reference position. In other words, in comparative example 2, the second image writing position $I_B$ is corrected based on the second detection position $Y_B$ detected by the second side end sensor DS2.

As a result, as shown in part (b) of FIG. 8, the second image position $L_B$ is at most about 0.5 mm, but the front-to-back difference ΔL has shifted to the negative side. This indicates that correcting the second image position $L_B$ based only on the second detection position $Y_B$ does not improve the front-to-back difference ΔL and may have the opposite effect.

[Details of the First Control]

Therefore, in the first control, the control portion 200 corrects the second image writing position $I_B$ based on the first detection position $X_A$, the second detection position $Y_B$ and the first image writing position $I_A$. Specifically, the second image writing position $I_B$ is expressed by the following formula (1).

$$I_B = Y_B - X_A + I_A \tag{1}$$

The first image position $L_A$ of the toner image formed on the first surface of sheet P and the second image position $L_B$ of the toner image formed on the first surface of sheet P are expressed by the following formulas (2) and (3).

$$L_A = X_A - I_A \tag{2}$$

$$L_B = X_B - I_B \tag{3}$$

Furthermore, the front-to-back difference ΔL, which is the difference between the first image position $L_A$ and the second image position $L_B$, is expressed by the following formula (4).

$$\Delta L = L_B - L_A \tag{4}$$

Then, substituting formulas (1) through (3) into formula (4), the following formula (5) is obtained.

$$\Delta L = X_B - Y_B \tag{5}$$

In other words, the front-to-back difference ΔL means the amount of deviation in the width direction W of the sheet P when the sheet P is conveyed from the second side end sensor DS2 to the first side end sensor DS1, and this deviation is generally relatively small.

Part (a) of FIG. 9 is a graph showing the first image writing position $I_A$ and the second image writing position $I_B$ in the first control for a double-sided printing job in which 30 sheets are continuously printed on both surfaces. Part (b) of FIG. 9 is a graph showing the first image position $L_A$, the second image position $L_B$, and the front-to-back difference ΔL in the first control.

In part (a) of FIG. 9, the first image writing position $I_A=0$. In other words, the first image writing position $I_A$ is set so that the center in the width direction W of the feeding conveyance path 107 as the conveyance path through which the sheet P is conveyed and the center in the width direction W of the electrostatic latent image formed on the photosensitive drum 11 coincide. If the writing position of the electrostatic latent image corresponding to the toner image to be transferred on the first surface of the sheet P is not corrected, the second image writing position $I_B=Y_B-X_A$ according to formula (1). In this case, the second image writing position $I_B$ means the amount of deviation in the width direction W of the sheet P when the sheet P is conveyed from the first side end sensor DS1 to the second side end sensor DS2.

The first image writing position $I_A=0$ is not required, in which case the front-to-back difference ΔL can be reduced by adding the first image writing position $I_A$ to the second image writing position $I_B$, as shown in formula (1) above.

As described above, in the first control, the second image writing position $I_B$ is corrected based on the first detection position $X_A$, the second detection position $Y_B$ and the first image writing position $I_A$. This reduces the front-to-back difference ΔL, and high-quality results can be obtained with less misalignment in the width direction W of the toner images on the front and back sides. In addition, since this system does not have a configuration to physically shift the conveying sheet P in the width direction W, the device can be made smaller.

At the time of shipment of the printer 100, the gap between the side regulation plate and the sheet P may be ascertained and the distance in the width direction W of the gap may be used as the first image writing position $I_A$. This can improve the positioning accuracy of the toner image formed on the first surface of the sheet P. The front-to-back difference $\Delta L=X_B-Y_B$ may be stored in memory 202 or the like at the time of shipment of the printer 100. Furthermore, this first image writing position $I_A$ and front-to-back difference ΔL at the time of shipment from the factory may be stored in memory 202, etc., as a plurality of table values based on the information of the sheet type, size, etc.

<Second Control>

Next, the second control of the control portion 200 is described. The second control differs from the first control only in the control of the first image writing position of the first sheet when multiple sheets are continuously conveyed.

FIG. 10 shows the leading end position of the sheet P during conveying and the various control timings in the printer 100, according to the second control. In the upper part of FIG. 10, the horizontal axis indicates the time, and the vertical axis indicates the leading end positions of the first and second sheets in a continuous-sheet passing job. In the lower part of FIG. 10, the secondary transfer timing, the detection timing of the first side end sensor DS1, the detection timing of the second side end sensor DS2, and the timing of image writing on the photosensitive drum 11 by the exposure unit 122 are shown.

In the second control, the third and subsequent sheets are controlled in the same way as the second sheet in a continuous-sheet passing job in which sheets are continuously conveyed, so the control for the third and subsequent sheets is omitted in FIG. 10. In the following, the subscripts of the image writing signal, first detection position, second detection position, and secondary transfer signal represent the sheets to be controlled in a continuous-sheet passing job. The first surface of the first sheet, the second surface of the first sheet, the first surface of the second sheet, the second surface of the second sheet, and the second surface of the second sheet in a continuous-sheet passing job are indicated by "1A", "1B", "2A", and "2B", respectively. For example, the first image writing position $I_{1A}$ indicates the position in the width direction W of the electrostatic latent image to be written on the photosensitive drum 11 to form the toner image to be transferred to the first surface of the first sheet. The first detection position $X_{2A}$ indicates the side end position of the first surface of the second sheet detected by the first side end sensor DS1.

The control portion 200 starts a print job upon receipt of a print execution instruction from the user via an operating portion 203 or a computer 204. The user may specify the number of copies to be printed, etc., as well as the type of sheet to be used for printing. The control portion 200 acquires sheet information accommodated in each cassette via the sheet size detection sensors 31*d* and 32*d*. After the print job is started and the first sheet P is fed at a time $t_{11}$, the first detection position $X_{1A}$ as the side end position of the sheet P is detected by the first side end sensor DS1 at a time $t_{12}$. Then, at a time $t_{13}$, an electrostatic latent image is formed at the first image writing position $I_{1A}$ of the photosensitive drum, and at a time $t_{14}$, the toner image is transferred to the first surface of the first sheet P.

This control causes the first sheet P to stop being held between the registration roller pairs 42 for the time corresponding to $t_{14}$-$t_{13}$ (hereinafter referred to as standby time), reducing the productivity of image output. However, when printing the first sheet P, the printer 100 may require time to expand (develop) the image data and for pre-processing of image forming in the image forming portion 30. The second control overlaps these print preparation times with the standby times mentioned above, thereby reducing the decline in productivity. In the second control, the first image writing position $I_{1A}$ for the first surface of the first sheet P is determined based on the first detection position $X_{1A}$ of the sheet P. This allows the first image position LIA of the toner image formed on the first surface of the sheet P to be highly accurate.

On the other hand, for the first surface of the second sheet P, as in the first control, the standby time was minimized without additional standby time for the sheet P at the registration roller pair 42. The second image writing position $I_{2A}$ was set to the same position as the first image writing position $I_{1A}$. This is the result of focusing on the fact that, in general, the amount of side end position deviation between adjacent sheets in a sheet bundle set in a cassette is relatively small, which enables relatively highly accurate image positioning on the first surface while maintaining productivity.

In other words, in a continuous-sheet passing job, the first detection position, the first image writing position, and the first electrostatic latent image of the first sheet are the first sheet first detection position ($X_{1A}$), the first sheet first image writing position ($I_{1A}$), and the first sheet first electrostatic latent image, respectively. At this time, the control portion 200 controls the exposure unit 122 so that in a continuous-sheet passing job, after the first sheet first detection position ($X_{1A}$) is detected by the first side end sensor DS1, the first image forming apparatus starts forming the first latent image at the first sheet first image writing position ($I_{1A}$) on the photosensitive drum 11. The control portion 200 determines the first sheet first image writing position ($I_{1A}$) based on the first sheet first detection position ($X_{1A}$). In a continuous-sheet passing job, for n, which is an integer greater than or equal to 2, the first detection position, first image writing position, and first electrostatic latent image of the nth sheet are the nth sheet first detection position ($X_{nA}$), nth sheet first image writing position ($I_{nA}$), and nth sheet first electrostatic latent image, respectively. At this time, the control portion 200 controls the exposure unit 122 so that the nth first image forming apparatus starts forming the nth first latent image at the nth first image writing position ($I_{nA}$) on the photosensitive drum 11 before the nth first detection position ($X_{nA}$) is detected by the first side end sensor DS1 in the continuous-sheet passing job. The control portion 200 makes the nth first image writing position ($I_{nA}$) the same position as the first image writing position ($I_{1A}$).

The control for the second surface of the sheet P is the same as the first control. For example, for the first sheet P, the second side end sensor DS2 detects the second detection position $Y_{1B}$ at a time $t_{18}$, and an electrostatic latent image is written at the second image writing position $I_{1B}$ at a time $t_{19}$. The second image writing position $I_{1B}$ is determined based on the first detection position $X_{1A}$, the second detection position $Y_{1B}$ and the first image writing position $I_{1A}$.

For the second sheet P, the second side end sensor DS2 detects the second detection position $Y_{2B}$ at a time $t_{21}$, and the electrostatic latent image is written at the second image writing position $I_{2B}$ at a time $t_{23}$. The second image writing position $I_{2B}$ is determined based on the first detection position $X_{2A}$, the second detection position $Y_{2B}$ and the first image writing position $I_{2A}$.

FIG. 11 is a flowchart showing an example of the second control described in FIG. 10. First, the control portion 200 starts feeding of the first sheet P accommodated in the cassette 32 (step S21), as shown in FIG. 11. Then, the first detection position $X_{1A}$ (end portion of the first surface of the first sheet) of the first sheet P is detected by the first side end sensor DS1 (step S22). Next, the control portion 200 outputs an image writing signal for the first surface of the first sheet P to the exposure unit 122 so as to write the toner image at the first image writing position $I_{1A}$ of the photosensitive drum 11 (step S23). The first image writing position $I_{1A}$ is determined based on the first detection position $X_{1A}$ of the first sheet P. The control portion 200 then outputs a secondary transfer portion signal $Tr_{1A}$ to transfer the toner image to the first surface of the first sheet P (step S24). When the secondary transfer signal $Tr_{1A}$ is output, the toner image on the intermediary transfer belt 21 is transferred to the first surface of the first sheet P at the transfer nip N1.

Next, the control portion 200 outputs an image writing signal for the first surface of the second sheet P to the exposure unit 122 so that the toner image is written on the second image writing position $I_{2A}$ of the photosensitive drum 11 (step S25). The control portion 200 then starts feeding the second sheet P accommodated in the cassette 32 (step S26), and the first detection position $X_{2A}$ (end portion of the first surface of the second sheet) of the second sheet P is detected by the first side end sensor DS1 (step S27). The control portion 200 then outputs the secondary transfer signal $Tr_{2A}$ for transferring the toner image to the first surface of the second sheet P (step S28). When the secondary transfer signal $Tr_{2A}$ is output, the toner image on the intermediary transfer belt 21 is transferred to the first surface of the second sheet P at the transfer nip N1.

Next, the control portion 200 starts reversing the first sheet P by the discharge reversing roller pair 71 to transfer the image to the second surface of the first sheet P (step S29). Thereafter, the second detection position $Y_{1B}$ (end portion of the second surface of the first sheet) of the sheet P is detected by the second side end sensor DS2 (step S30). Next, the control portion 200 outputs an image writing signal for the second surface of the first sheet P to the exposure unit 122 so that a toner image is written at the second image writing position $I_{1B}$ of the photosensitive drum 11 (step S31). The second image writing position $I_{1B}$ is determined based on the first detection position $X_{1A}$, the second detection position $Y_{1B}$ and the first image writing position $I_{1A}$. The third detection position $X_{1B}$ of the first sheet P is detected by the first side end sensor DS1 (step S32).

Next, the control portion 200 starts reversing the second sheet P by the discharge reversing roller pair 71 to transfer the image to the second surface of the second sheet P (step S33). Thereafter, the second detection position $Y_{2B}$ (end portion of the second surface of the second sheet) of the sheet P is detected by the second side end sensor DS2 (step S34). The control portion 200 then outputs the secondary transfer portion signal $Tr_{1B}$ to transfer the toner image to the second surface of the first sheet P (Step S35). When the secondary transfer signal $Tr_{1B}$ is output, the toner image on the intermediary transfer belt 21 is transferred to the second surface of the first sheet P at the transfer nip N1.

Next, the control portion 200 outputs an image writing signal for the second surface of the second sheet P to the exposure unit 122 so that the toner image is written on the second image writing position $I_{2B}$ of the photosensitive drum 11 (step S36). The second image writing position $I_{2B}$ is determined based on the first detection position $X_{2A}$, the second detection position $Y_{2B}$ and the first image writing position $I_{2A}$. The third detection position $X_{2B}$ of the second sheet P is detected by the first side end sensor DS1 (step S37).

The first sheet P is then discharged to one of the discharge trays 80 and 82 by the sheet discharge device 90 (step S38). Next, the control portion 200 outputs a secondary transfer portion signal $Tr_{2B}$ to transfer the toner image to the second surface of the second sheet P (step S39). When the secondary transfer signal $Tr_{2B}$ is output, the toner image on the intermediary transfer belt 21 is transferred to the second surface of the second sheet P at the transfer nip N1. The second sheet P is then discharged to one of the discharge trays 80 and 82 by the sheet discharge device 90 (step S40).

Part (a) of FIG. 12 is a graph showing the first image writing position $I_{nA}$ and the second image writing position $I_{nB}$ in the second control in a double-sided printing job in which 30 sheets are continuously printed on both surfaces. Part (b) of FIG. 12 is a graph showing the first image position $L_{nA}$, the second image position $L_{nB}$, and the front-to-back difference $\Delta L_n$ in the second control. n is an integer satisfying $1 \leq n \leq 30$. The side end positions of the sheet P are the same as those described in FIG. 6.

As described above, in the second control, the first image writing position $I_{1A}$ for the first surface of the first sheet P is determined based on the first detection position $X_{1A}$ of that sheet P. Therefore, as shown in part (b) of FIG. 12, the first image position $L_A$ of the first sheet P is improved to almost zero.

As shown in part (a) of FIG. 12, the first detection position $X_{1A}$ is rising steadily as the number of sheets advances. This corresponds to the transition of the detection result of the side end position of sheet P shown in FIG. 6. In the second control, the first image writing position $I_{nA}$ for the nth sheet ($n \geq 2$) of a job is determined based on the first detection position from the first sheet to the (n−1)th sheet of the job. For example, if there is a large short-term variation in the first detection position, the first image writing position $I_{nA}$ for the nth sheet of a job may be determined based on the averaged value of the first detection position for the m immediately preceding sheets (from the (n−m)th to (n−1)th sheet of the job). The first image writing position $I_{nA}$ for the nth ($n \geq 2$) sheet of a job may be determined based on the first detection position $X_{(n-1)A}$ for the (n−1)th sheet of a job.

As described above, in the second control, the first image writing position $I_{1A}$ for the first surface of the first sheet P of a job is determined based on the first detection position $X_{1A}$ of that sheet P. The first image writing position $I_{nA}$ for a job's nth sheet ($n \geq 2$) is determined based on the first detection position from the first sheet to the (n−1)th sheet of the job. As shown in part (b) of FIG. 12, this makes the first image position $L_{nA}$ and the second image position $L_{nB}$ more precise, although the same as in the first control (see part (b) of FIG. 9) for the front-to-back difference ΔL. For example, the images on the first and second surfaces can be formed closer to the center of sheet P. Thus, high-quality results can be obtained.

The second control overlaps the job's print preparation time and the standby time for the first sheet P at the registration roller pair 42, thereby reducing the loss of productivity.

Although the second control focuses on the first sheet P of a job, the second control may be applied to the first sheet P after switching the cassette that serves as the feed source, even for the same job. For example, if the feeding source of sheet P is switched from cassette 32 as the second accommodating portion to cassette 31 as the first accommodating portion during a job, the second control may be applied to the first sheet P fed from cassette 31.

The second control may be applied to the first sheet P after the cassette is detected to be attached or detached. For example, in a job in which sheets P are continuously fed from cassette 32, if cassette 32 is attached or detached in the middle of the job, the second control may be applied to the first sheet P after cassette 32 as an accommodating portion is mounted to the main body of the apparatus 100A. These controls may be configured to be selectable according to the priorities of productivity of the printer 100 and image printing accuracy.

<Third Control>

Next, the third control of the present invention is described. The third control differs from the second control only in the control concerning the second image writing position of the second and subsequent sheets P. For this reason, the same configurations as in the second control are omitted or indicated with the same symbols in the figures.

FIG. 13 shows the leading end position of sheet P during conveying and various control timings in printer 100, according to the third control. In the upper part of FIG. 13, the horizontal axis indicates the time, and the vertical axis indicates the leading end position of the first and second sheets in a continuous-sheet passing job. In the lower part of FIG. 13, the secondary transfer timing, the detection timing of the first side end sensor DS1, the detection timing of the second side end sensor DS2, and the timing of the image writing to the photosensitive drum 11 by the exposure unit 122 are shown.

In the third control, the operation and control of the first surface of the first sheet P and the first surface of the second sheet P are the same as in the second control (see FIG. 10) until the sheet P is stopped and inverted by the discharge reversing roller pair 71. In the third control, as shown in FIG. 13, the side end position of the second surface of the first sheet P, or the third detection position $X_{1B}$, is detected by the first side end sensor DS1 at time $t_{20}$. Then, at time $t_{19}$, an electrostatic latent image is formed at the second image writing position $I_{1B}$ on the photosensitive drum.

The control portion 200 calculates the deviation amount $D_1=X_{1B}-Y_{1B}$ based on the detection results of the first side end sensor DS1 and the second side end sensor DS2, and stores the deviation amount $D_1$ in the memory 202. The deviation amount $D_1$ means the amount of deviation in the width direction W of the sheet P when the sheet P is conveyed from the second side end sensor DS2 to the first side end sensor DS1. In the third control, the deviation amount $D_1$ is added to the second image writing position $I_{1B}$. Similarly, the deviation amount $D_1$ is added to the second image writing position $I_{nB}$ of the nth sheet P (n is 2 or more).

The second image writing position $I_{nB}$ in the third control is expressed by the following formula (6).

$$I_{nB} = Y_{nB} - X_{nA} + D_1 + I_{nA} \tag{6}$$

That is, the first detection position, second detection position, third detection position, first image writing position, second image writing position, and second electrostatic latent image of the first sheet in a continuous-sheet passing job are the first detection position ($X_{1A}$), second detection position ($Y_{1B}$), third detection position ($X_{1B}$), first image writing position ($I_{1A}$), the second image writing position ($I_{1B}$), and the second electrostatic latent image of the first sheet. The difference between the third detection position ($X_{1B}$) of the first image and the second detection position ($Y_{1B}$) of the first image is defined as the deviation ($D_1$) of the first image. At this time, the control portion 200 controls the exposure unit 122 so that the first sheet second electrostatic latent image forming starts at the first sheet second image writing position ($I_{1B}$) on the photosensitive drum 11 after the first sheet third detection position ($X_{1B}$) is detected by the first side end sensor DS1 in the continuous-sheet passing job. The control portion 200 determines the first sheet second image writing position ($I_{1B}$) based on the first sheet first image writing position ($I_{1A}$), the first detection position ($X_{1A}$), the second detection position ($Y_{1B}$), and the first deviation amount ($D_1$).

In a continuous-sheet passing job, for n, which is an integer greater than or equal to 2, the first detection position, second detection position, third detection position, first image writing position, second image writing position, and second electrostatic latent image of the nth sheet are respectively the nth sheet first detection position ($X_{nA}$), nth sheet second detection position ($Y_{nB}$), nth sheet 3rd detection position ($X_{nB}$), nth first image writing position ($I_{nA}$), nth second image writing position ($I_{nB}$), and nth second electrostatic latent image, respectively. At this time, the control portion 200 controls the exposure unit 122 so that the nth second electrostatic latent image forming is started at the nth second image writing position ($I_{nB}$) on the photosensitive drum 11 before the nth third detection position ($X_{nB}$) is detected by the first side end sensor DS1. The control portion 200 determines the nth second image writing position ($I_{nB}$) based on the nth first image writing position ($I_{nA}$), the nth first detection position ($X_{nA}$), the nth second detection position ($Y_{nB}$), and the first deviation amount ($D_1$).

However, for the first sheet P, the second image writing position $I_{nB}$ can also be expressed by the following formula (7).

$$I_{nB} = X_{1B} - X_{1A} + I_{nA} \tag{7}$$

In other words, the control portion 200 determines the first sheet second image writing position ($I_{1B}$) based on the first sheet first image writing position ($I_{1A}$), the first detection position ($X_{1A}$), and the third detection position ($X_{1B}$).

FIG. 14 is a flowchart showing an example of the third control described in FIG. 13. The flowchart in FIG. 14 is similar to the flowchart in FIG. 11 for steps S21-S30 and S33-S40, so the explanation is omitted.

After step S30, the third detection position $X_{1B}$ of the first sheet P is detected by the first side end sensor DS1 (step S41). Next, the control portion 200 outputs an image writing signal for the second surface of the first sheet P to the exposure unit 122 so that a toner image is written at the second image writing position $I_{1B}$ of the photosensitive drum 11 (step S42). The second image writing position $I_{1B}$ is determined based on the first detection position $X_{1A}$, the third detection position $X_{1B}$ and the first image writing position $I_{1A}$. Thereafter, steps S33 to S40 are similar to the second control shown in FIG. 11.

Part (a) of FIG. 15 is a graph showing the first image writing position $I_{nA}$ and the second image writing position $I_{nB}$ in the third control in a double-sided printing job in which 30 sheets are continuously printed on both surfaces. Part (b) of FIG. 15 is a graph showing the first image position $L_{nA}$, the second image position $L_{nB}$, and the front-to-back difference $\Delta L_n$ in the third control. Nis an integer satisfying $1 \leq n \leq 30$. The side end positions of the sheet P are the same as those described in FIG. 6.

The second image writing position $I_{nB}$ of the third control ("Δ" in part (a) FIG. 15) is added by a deviation amount D1 compared to the second image writing position $I_{nB}$ of the second control ("Δ" in part (a) of FIG. 12). As a result, the second image position $L_{nB}$ of sheet P is improved compared to the second control, as shown in part (b) of FIG. 15. The front-to-back difference $\Delta L_n$ of the sheet P is also improved compared to the second control.

As described above, in the third control, the deviation amount D1 calculated from the detection results of the first side end sensor DS1 and the second side end sensor DS2 is added to the second image writing position $I_{nB}$ of the sheet P. As shown in part (b) of FIG. 15, this further improves the accuracy of the first image position $L_{nA}$ and the second image position $L_{nB}$. In addition, the front-to-back difference $\Delta L_n$ can be further reduced, resulting in a high-quality product with less deviation of the toner images on the front and back sides in the width direction W.

The deviation amount $D_1$ is also added for the second image writing position $I_{nB}$ of the second and subsequent sheets, i.e., the nth sheet (n is 2 or more). Therefore, for the second and subsequent sheets P, a high-quality product with a small front-to-back difference $\Delta L_n$ can be obtained without reducing productivity.

In the third control, the deviation amount $D_1$ was also added for the second image writing position $I_{nB}$ of the nth sheet P (n is two or more), but is not limited to this. For example, the control portion 200 may also calculate and store the deviation amount for the first and subsequent sheets P. Then, the deviation amount $D_{n-1}$ of the immediately preceding sheet P may be added to the second image writing position $I_{nB}$ of the nth sheet P (n is two or more). The value obtained by averaging the deviation amount $D_{n-m}$ to $D_{n-1}$ of the immediately preceding m sheets ((n−m)th to (n−1)th sheet) may be added to the second image writing position $I_{nB}$.

As in the second control, the amount of deviation of the first sheet P after the cassette that serves as the feed source is switched or after the cassette is detected to be attached or detached may be added to the second image writing position $I_{nB}$ as the deviation amount $D_1$.

As the image forming apparatus (printer 100) in this form, the cassette 31 has the shortest conveyance distance from the feeding portion (pick-up roller) to the secondary transfer portion (transfer nip N1). For this reason, the first control is used when feeding sheet P from cassette 31, and the "FCOT (First Copy Output Time)," which is used as one of the indicators of copying performance and is the time taken to load a sheet into the image forming apparatus and press the start button, and until the first sheet comes out of the image, can be reduced.

In the cassette 32, where the feeding portion (pick-up roller) to the secondary transfer portion (transfer nip portion N1) is longer than in the cassette 31, the second control is adopted. In the cassette 32 that employs the second control, "FCOT" is larger than in the cassette 31 that employs the first control, but the accuracy of the image position, especially with respect to the first surface of the first sheet P, can be improved.

The third control is used for the manual feed tray 33, where the transfer distance from the feeding portion (pick-up roller) to the secondary transfer portion (transfer nip N1) is longer than that of the cassette 31. The third control can improve the accuracy of image positioning, especially with respect to the second surface of the sheet P.

It may be set arbitrarily which of the first, second, or third control is applied to cassettes 31, 32, and manual feed tray 33. The same control among the first, second, and third controls may be applied to more than one of the cassettes 31, 32, and the manual feed tray 33. For example, the first control may be applied to all of the cassettes 31, 32 and the manual feed tray 33, the second control may be applied, or the third control may be applied. The setting of which of the first through third controls is to be performed at which feeding source (cassettes 31, 32 and manual feed tray 33) may be configured to be selectively changed by the operating portion 203.

Other Embodiments

In the above embodiment, the first side end sensor DS1 was located upstream of the registration roller pair 42 in the sheet conveyance direction CD, but it is not limited to this. For example, the first side end sensor DS1 may be positioned between the registration roller pair 42 and the transfer nip N1 in the sheet conveyance direction CD.

In the above embodiment, the second side end sensor DS2 was positioned between the conveyance roller pairs 72 and 73 in the sheet conveyance direction CD, but it is not limited to this. For example, the second side end sensor DS2 may be located upstream of the conveyance roller pair 72 or downstream of the conveyance roller pair 73 in the sheet conveyance direction CD. The second side end sensor DS2 is positioned so that even if image writing on the photosensitive drum 11 is started after the second side end sensor DS2 detects the side end position of the sheet P, the toner image is transferred to the second surface of the sheet P in time at the transfer nip N1. In other words, the second side end feed sensor DS2 is determined based on the component arrangement of the image forming portion 30, the toner image conveyance speed, the arrangement of the double-sided conveyance path 163, and the conveyance speed of the sheet P.

In the above embodiment, the detection timing of the first side end sensor DS1 or the second side end sensor DS2 is defined as the timing when the leading end of the sheet P reaches the first side end sensor DS1 or the second side end sensor DS2, but is not limited to this. For example, the first side end sensor DS1 or the second side end sensor DS2 may detect the side end position of the sheet P a predetermined time after the leading end of the sheet P reaches the first side end sensor DS1 or the second side end sensor DS2.

In the above embodiment, the first and second image writing positions of the photosensitive drum 11 forming a yellow (Y) toner image were explained as an example, but the same control is applied to the photosensitive drums forming toner images of other colors. The image writing timing is described using, as an example, the timing of writing an electrostatic latent image by the exposure unit 122 on the photosensitive drum 11, but it is not limited to this. In the printer 100 shown in FIG. 1, the writing of the electrostatic latent image to the photosensitive drum 11 that forms the yellow (Y) toner image must be done earliest, compared to the writing of the electrostatic latent image to the photosensitive drum that forms the toner image of other colors. For this reason, the image writing timing in the previously described embodiments was explained using the timing of writing the electrostatic latent image on the photosensitive drum 11 by the exposure unit 122 as an example. However, if the image forming portion 30 is configured to form a toner image other than yellow (Y) first, for example, the control of each formation may be implemented based on the timing of writing the image to the photosensitive drum that forms the toner image of that color.

In the embodiments described above, an intermediary transfer tandem system printer is used as an example, but it is not limited to this. For example, the control of each form may be applied to a direct transfer system in which direct transfer is performed from each photosensitive drum to a sheet, or to a printer with only one photosensitive drum.

In the third control, as in the second control, the first image writing position $I_{1A}$ for the first surface of the first sheet P was determined based on the first detection position $X_{1A}$ of said sheet P. However, this is not limited to this. For example, in the third control, as in the first control, the first image writing position $I_{nA}=0$ may be used.

In the second and third controls described above, the control for the first sheet and the control for the second and subsequent sheets were different. However, in a job in which multiple sheets are continuously conveyed, the control for the first sheet described above can be read as the control for the preceding sheet, and the control for the second and subsequent sheets described above can be read as the control for the subsequent sheets following the preceding sheet. In other words, the control for the first sheet described above is not limited to the first sheet, but may be performed for any sheet in a job in which multiple sheets are continuously conveyed (hereinafter referred to as the Kth sheet). The control for the second and subsequent sheets described above may be performed for any sheet after the Kth sheet (hereinafter referred to as the K+fth sheet). The number f is an arbitrary integer greater than or equal to 1.

The present invention can also be realized by supplying a program that realizes one or more functions of the above embodiments to a system or device via a network or a storage medium, and processing in which one or more processors in the computer of the system or device read and execute the program. It can also be realized by a circuit (e.g., ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2023-013960 filed on Feb. 1, 2023, and 2023-206520 filed on Dec. 6, 2023, which are hereby incorporated by reference herein in their entirety.

What is claimed is:

1. An image forming apparatus comprising:

a photosensitive member;

an exposing portion configured to expose the photosensitive member and to form a first electrostatic latent image and a second electrostatic latent image on the photosensitive member;

a developing portion configured to develop the first electrostatic latent image and the second electrostatic latent image on the photosensitive member as a first toner image and a second toner image, respectively;

a transfer portion configured to transfer the first toner image and the second toner image onto a first surface and a second surface of a sheet, respectively;

a re-conveyance portion configured to reverse a front surface and a back surface of the sheet on which the first toner image is transferred on the first surface by the transfer portion and to convey the sheet to the transfer portion again;

a first detecting portion, in an upstream position of the transfer portion with respect to a sheet conveyance direction, configured to detect a first detecting position which is a position of the sheet before the first toner image is transferred to the first surface with respect to a widthwise direction perpendicular to the sheet conveyance direction;

a second detecting portion, in the re-conveyance portion, configured to detect a second detecting position which is a position of the sheet after the first toner image has been transferred to the first surface and before the second toner image is transferred to the second surface with respect to the widthwise direction; and a control portion configured to control the exposing portion so as to form the first electrostatic latent image on the photosensitive member at a first image forming position and to form the second electrostatic latent image on the photosensitive member at a second image forming position, wherein the control portion executes in a first mode in which the control portion determines the first image forming position before the first detecting position of the sheet is detected by the first detecting portion and determines the second image forming position based on the first image forming position, the first detecting position and the second detecting position.

2. An image forming apparatus according to claim 1, wherein the control portion determines the first image forming position so that a center of a conveyance passage through which the sheet is conveyed in the widthwise direction and a center of the first electrostatic latent image formed on the photosensitive member in the widthwise direction coincide with each other.

3. An image forming apparatus according to claim 1, wherein the control portion executes in a second mode in which the control portion determines the first image forming position after the first detecting position of the sheet is detected by the first detecting portion and determines the second image forming position based on the first detecting position and the second detecting position.

4. An image forming apparatus according to claim 3, wherein in a job in which a plurality of the sheets are continuously conveyed, when the first detecting position, the first image forming position and the first electrostatic latent image of a first sheet are defined as a first sheet first detecting position, a first sheet first image forming position and a first sheet first electrostatic latent image, respectively, the control portion controls the exposing portion in a case of executing in the second mode in the job so that formation of the first sheet first electrostatic latent image is started at the first sheet first image forming position on the photosensitive member after the first sheet first detecting position is detected by the first detecting portion and determines the first sheet first image forming position based on the first sheet first detecting position.

5. An image forming apparatus according to claim 4, wherein in the job, when the first detecting position, the first image forming position and the first electrostatic latent image of an n-th (n is an integer of 2 or more) sheet are defined as an n-th sheet first detecting position, an n-th sheet first image forming position and an n-th sheet first electrostatic latent image, respectively, the control portion controls the exposing portion in a case of executing in the second mode in the job so that formation of the n-th sheet first electrostatic latent image is started at the n-th sheet first image forming position on the photosensitive member after the n-th sheet first detecting position is detected by the first detecting portion and determines the n-th sheet first image forming position as the same position as the first sheet first detecting position.

6. An image forming apparatus according to claim 1, wherein, in the upstream position of the transfer portion with respect to the sheet conveyance direction, the first detecting portion further detects a third detecting position which is a position of the sheet after the first toner image is transferred to the first surface and before the second toner image is transferred to second surface with respect to the widthwise direction, and wherein the control portion executes in a second mode in which the control portion determines the first image forming position after the first detecting position of the sheet is detected by the first detecting portion and determines the second image forming position based on the first image forming position, the first detecting position, the second detecting position and the third detecting position.

7. An image forming apparatus according to claim 6, wherein in a job in which a plurality of the sheets are continuously conveyed, when the first detecting position, the second detecting position, the third detecting position, the first image forming position, the second image forming position and the second electrostatic latent image of a first sheet are defined as a first sheet first detecting position, a first sheet second detecting position, a first sheet third detecting position, a first sheet first image forming position, first sheet second image forming position and a first sheet second electrostatic latent image, respectively, and a difference between the first sheet third detecting position and the first sheet second detecting position is defined as a first sheet deviation amount, the control portion controls the exposing portion in a case of executing in the second mode in the job so that formation of the first sheet second electrostatic latent image is started at the first sheet second image forming position on the photosensitive member after the first sheet third detecting position is detected by the first detecting portion and determines the first sheet second image forming position based on the first sheet first image forming position, the first sheet first detecting position, the first sheet second detecting position and the first sheet deviation amount.

8. An image forming apparatus according to claim 7, wherein in the job, when the first detecting position, the second detecting position, the third detecting position, the first image forming position, the second image forming position and the second electrostatic latent image of an n-th (n is an integer of 2 or more) sheet are defined as an n-th sheet first detecting position, an n-th sheet second detecting position, an n-th sheet third detecting position, an n-th sheet first image forming position, an n-th sheet second image forming position and an n-th sheet second electrostatic latent image, respectively, the control portion controls the exposing portion in a case of executing in the second mode in the job so that formation of the n-th sheet second electrostatic latent image is started at the n-th sheet second image forming position on the photosensitive member before the n-th sheet third detecting position is detected by the first detecting portion and determines the n-th sheet second image forming position based on the n-th sheet first image forming position, the n-th sheet first detecting position, the n-th sheet second detecting position and the first sheet deviation amount.

9. An image forming apparatus according to claim 6, wherein, in the upstream position of the transfer portion with respect to the sheet conveyance direction, the first detecting portion further detects a third detecting position which is a position of the sheet after the first toner image is transferred to the first surface and before the second toner image is transferred to second surface with respect to the widthwise direction, and wherein in a job in which a plurality of the sheets are continuously conveyed, when the first detecting position, the third detecting position, the first image forming position, the second image forming position and the second electrostatic latent image of a first sheet are defined as a first sheet first detecting position, a first sheet third detection position, a first sheet first image forming position, a first sheet second image forming position and a first sheet second electrostatic latent image, respectively, the control portion controls the exposing portion in a case of executing in the second mode in the job so that formation of the first sheet second electrostatic latent image is started at the first sheet second image forming position on the photosensitive member after the first sheet third detecting position is detected by the first detecting portion and determines the first sheet second image forming position based on the first sheet first image forming position, the first sheet first detecting position and the first sheet third detecting position.

10. An image forming apparatus according to claim 4, further comprising a first accommodating portion and a second accommodating portion configured to accommodate the sheets, respectively, wherein the first sheet includes a first sheet after a feeding source of the sheet in the job is changed from the first accommodating portion to the second accommodating portion.

11. An image forming apparatus according to claim 4, further comprising a main assembly; and an accommodating portion detachably mounted to the main assembly and configured to accommodate the sheets, wherein the first sheet includes a first sheet after the accommodating portion as a feeding source of the sheet in the job is mounted to the main assembly.

12. An image forming apparatus according to claim 1, further comprising a conveyance portion disposed upstream of the transfer portion with respect to the sheet conveyance direction and configured to convey the sheet to the transfer portion in synchronism with an image forming timing, wherein the first detecting portion is disposed upstream of the conveyance portion with respect to the sheet conveyance direction.

13. An image forming apparatus according to claim 1, further comprising an intermediary transfer member; and a primary transfer portion configured to transfer the first toner image and the second toner image on the photosensitive member to the intermediary transfer member, wherein the transfer portion is a secondary transfer portion configured to transfer the first toner image and the second toner image on the photosensitive member to the first surface and the second surface of the sheet, respectively.

* * * * *